United States Patent
Zapolsky et al.

(10) Patent No.: US 11,845,184 B2
(45) Date of Patent: Dec. 19, 2023

(54) SYSTEM AND/OR METHOD FOR GRASPING OBJECTS

(71) Applicant: Dextrous Robotics, Inc., Memphis, TN (US)

(72) Inventors: Samuel Zapolsky, Memphis, TN (US); Evan Drumwright, Memphis, TN (US)

(73) Assignee: Dextrous Robotics, Inc., Memphis, TN (US)

( * ) Notice: Subject to any disclaimer, the term of this patent is extended or adjusted under 35 U.S.C. 154(b) by 0 days.

(21) Appl. No.: 18/136,215

(22) Filed: Apr. 18, 2023

(65) Prior Publication Data

US 2023/0330843 A1    Oct. 19, 2023

Related U.S. Application Data

(60) Provisional application No. 63/332,168, filed on Apr. 18, 2022.

(51) Int. Cl.
*B25J 9/00* (2006.01)
*B25J 9/16* (2006.01)

(52) U.S. Cl.
CPC ............ *B25J 9/1612* (2013.01); *B25J 9/161* (2013.01); *B25J 9/163* (2013.01); *B25J 9/1633* (2013.01); *B25J 9/1653* (2013.01); *B25J 9/1666* (2013.01)

(58) Field of Classification Search
CPC ...... B25J 13/082; B25J 15/0038; B25J 9/163; B25J 9/046; G05B 19/39343; G05B 19/39346; G05B 2219/50391
See application file for complete search history.

(56) References Cited

U.S. PATENT DOCUMENTS

| | | |
|---|---|---|
| 5,651,574 A | 7/1997 | Tanikawa et al. |
| 8,276,959 B2 | 10/2012 | Kim |
| 9,283,676 B2 | 3/2016 | Shi et al. |
| 10,618,172 B1 | 4/2020 | Diankov et al. |
| 2004/0103740 A1 | 6/2004 | Townsend et al. |
| 2007/0073442 A1 | 3/2007 | Aghili |
| 2008/0247857 A1 | 10/2008 | Yuasa et al. |
| 2009/0158864 A1 | 6/2009 | Hayakawa et al. |
| 2010/0204713 A1 | 8/2010 | Ruiz |
| 2013/0147944 A1* | 6/2013 | Zhang ............... B25J 9/1687 348/95 |
| 2014/0083230 A1 | 3/2014 | Calisti et al. |
| 2014/0156066 A1 | 6/2014 | Sakano |
| 2014/0265394 A1 | 9/2014 | Pergande et al. |
| 2014/0277742 A1 | 9/2014 | Wells et al. |
| 2015/0127150 A1 | 5/2015 | Ponulak et al. |

(Continued)

FOREIGN PATENT DOCUMENTS

| | | |
|---|---|---|
| CN | 108858199 A | 11/2018 |
| EP | 2392435 A2 | 12/2011 |

(Continued)

*Primary Examiner* — Dalena Tran
(74) *Attorney, Agent, or Firm* — Jeffrey Schox

(57) ABSTRACT

The method can include: optionally providing a set of grasp tools; determining an object model for a grasp; determining a grasp contact configuration; and facilitating grasp execution with the set of grasp tools. However, the method S100 can additionally or alternatively include any other suitable elements. The method functions to facilitate non-destructive and/or stable object grasping (and/or object manipulation) using a set of grasp tools.

20 Claims, 20 Drawing Sheets

(56) References Cited

U.S. PATENT DOCUMENTS

| | | | |
|---|---|---|---|
| 2016/0221187 A1 | 8/2016 | Bradski et al. | |
| 2016/0243704 A1 | 8/2016 | Vakanski et al. | |
| 2016/0327934 A1 | 11/2016 | Morimoto | |
| 2017/0252922 A1 | 9/2017 | Levine et al. | |
| 2017/0297198 A1 | 10/2017 | Lawrence et al. | |
| 2019/0030728 A1 | 1/2019 | Nagata et al. | |
| 2019/0060019 A1 | 2/2019 | Maret | |
| 2019/0061159 A1 | 2/2019 | Domae et al. | |
| 2019/0261566 A1 | 8/2019 | Robertson et al. | |
| 2019/0308320 A1 | 10/2019 | Konishi | |
| 2019/0321974 A1 | 10/2019 | Leon et al. | |
| 2020/0380779 A1* | 12/2020 | Khazov | G06T 7/75 |
| 2020/0391385 A1 | 12/2020 | Oka et al. | |
| 2021/0001481 A1 | 1/2021 | Hayashi et al. | |
| 2021/0178591 A1 | 6/2021 | Floyd-Jones et al. | |
| 2021/0369359 A1 | 12/2021 | Blanckaert et al. | |
| 2022/0234200 A1 | 7/2022 | Narita et al. | |
| 2022/0288782 A1* | 9/2022 | Bennice | B25J 9/163 |
| 2022/0391638 A1* | 12/2022 | Fan | G06N 3/045 |
| 2023/0080768 A1* | 3/2023 | Soltani Zarrin | B25J 9/163 |
| | | | 700/246 |

FOREIGN PATENT DOCUMENTS

| | | |
|---|---|---|
| EP | 3278939 A1 | 2/2018 |
| JP | 2008260110 A | 10/2008 |
| JP | 2010201538 A | 9/2010 |
| JP | 2018202541 A | 12/2018 |
| JP | 6458912 B1 | 1/2019 |
| KR | 20110016315 A | 2/2011 |
| WO | 2005009691 A1 | 2/2005 |
| WO | 2018087546 A1 | 5/2018 |

* cited by examiner

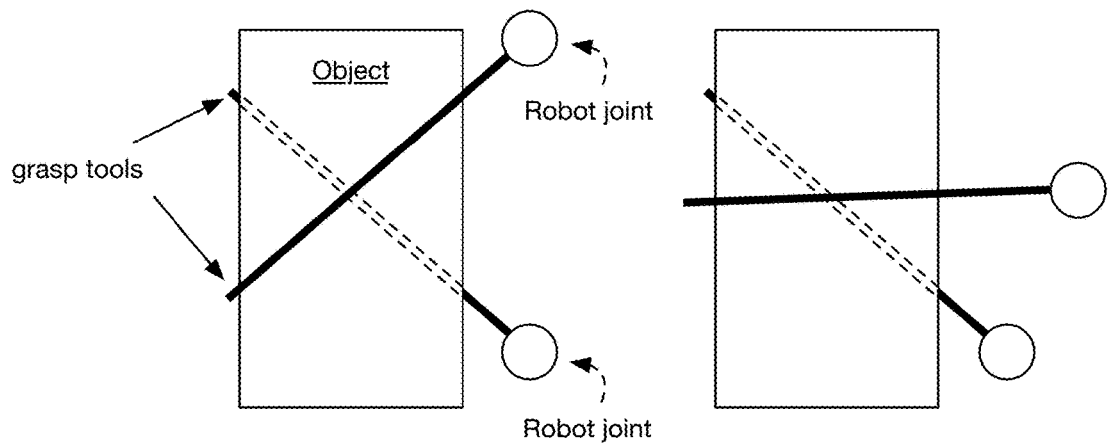
FIGURE 11A
FIGURE 11B
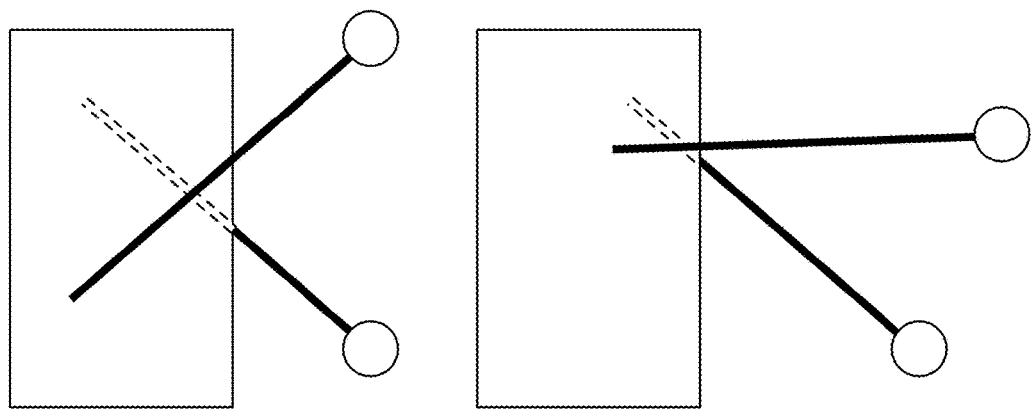
FIGURE 11C
FIGURE 11D

SYSTEM AND/OR METHOD FOR GRASPING OBJECTS

CROSS REFERENCE TO RELATED APPLICATIONS

This application claims the benefit of U.S. Provisional Application No. 63/332,168, filed 18 Apr. 2022, which is incorporated herein in its entirety by this reference.

This application is related to U.S. application Ser. No. 17/630,720, filed Jan. 27, 2022, U.S. application Ser. No. 17/630,795, filed 27 Jan. 2022, and U.S. application Ser. No. 17/630,804, filed 27 Jan. 2022, each of which is incorporated herein in its entirety by this reference.

TECHNICAL FIELD

This invention relates generally to the robotics field, and more specifically to a new and useful object grasping system and/or method in the robotics field.

BRIEF DESCRIPTION OF THE FIGURES

FIGS. 11A-11D are side view representations of variants of a grasp configuration.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview.

Figure 1:
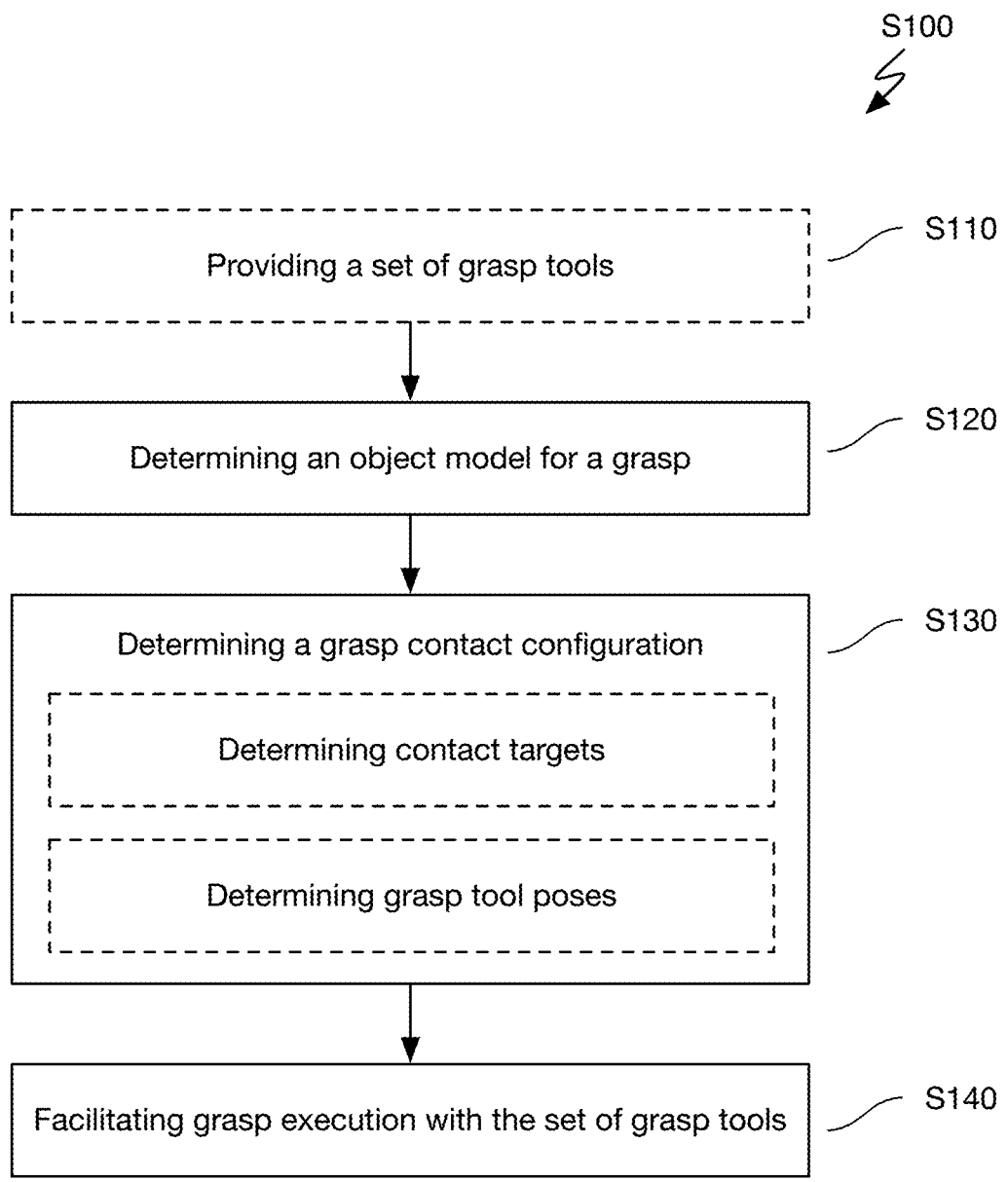
FIG. 1 is a flowchart diagrammatic representation of a variant of the method.

The method S100, an example of which is shown in FIG. 1, can include: optionally providing a set of grasp tools S110; determining an object model for a grasp S120; determining a grasp contact configuration S130; and facilitating grasp execution with the set of grasp tools S140. However, the method S100 can additionally or alternatively include any other suitable elements. The method functions to facilitate non-destructive and/or stable object grasping (and/or object manipulation) using a set of grasp tools.

Additionally or alternatively, the method can include (and/or can be used in conjunction with) updating a set of model parameters S200. Additionally or alternatively, the method can include (and/or can be used in conjunction with) updating a set of model parameters S300.

However, the method can additionally or alternatively include any other suitable elements.

2. Benefits.

Variations of the technology can afford several benefits and/or advantages.

Figure 2A:
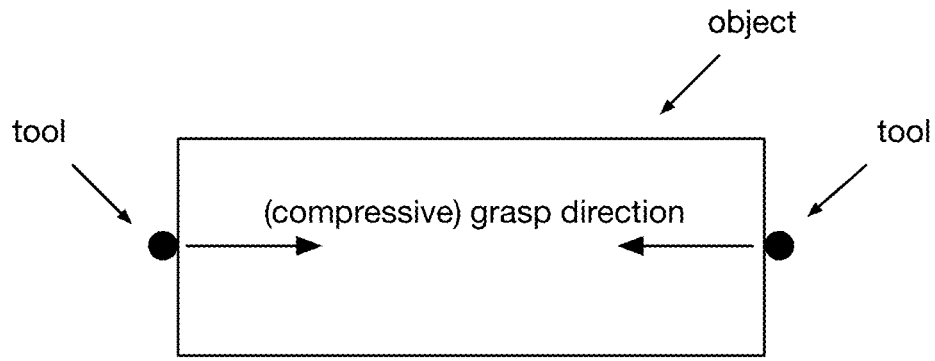
FIGS. 2A-2C are a first, second, and third schematic representation of a variant of the system, respectively, illustrating grasp forces for a 2D cross section.
Figure 2B:
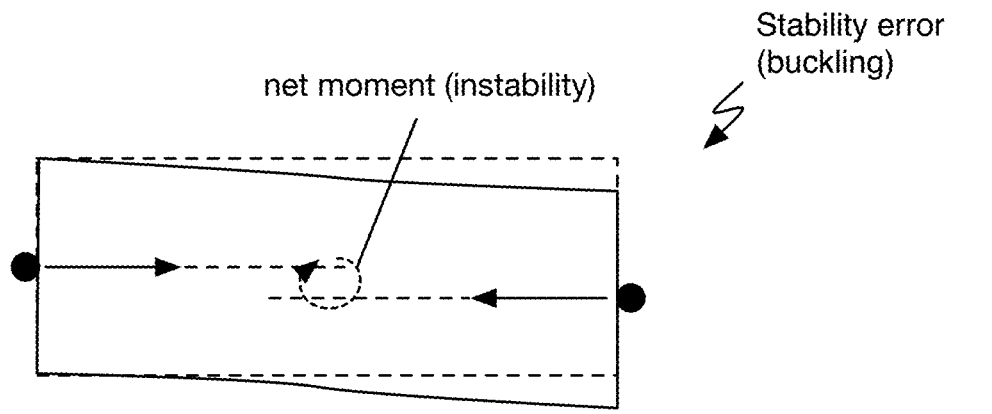
Figure 2C:
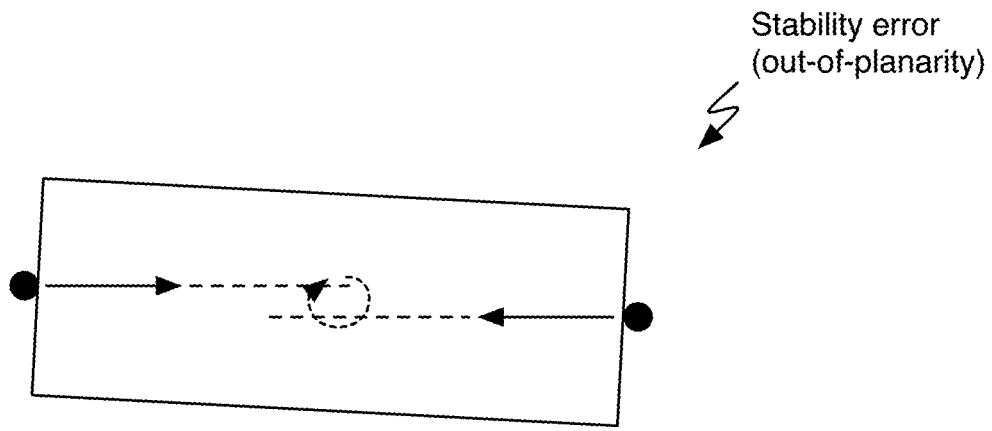
Figure 3A:
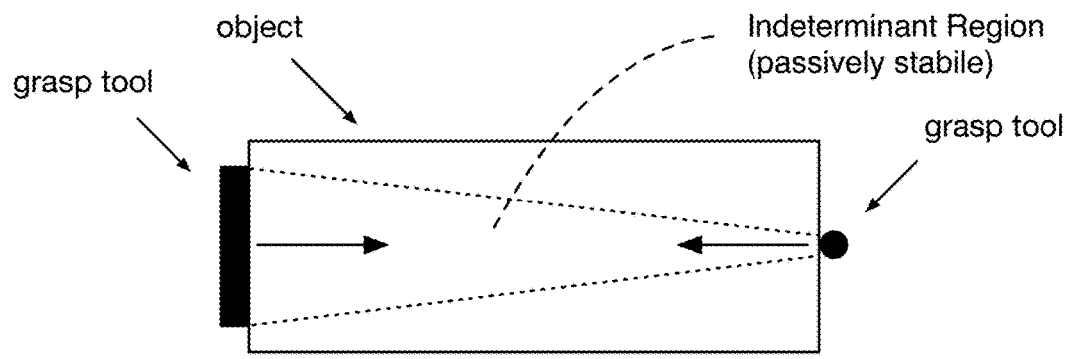
FIGS. 3A-3C are a first, second, and third schematic representation of a variant of the system, respectively.
Figure 3B:
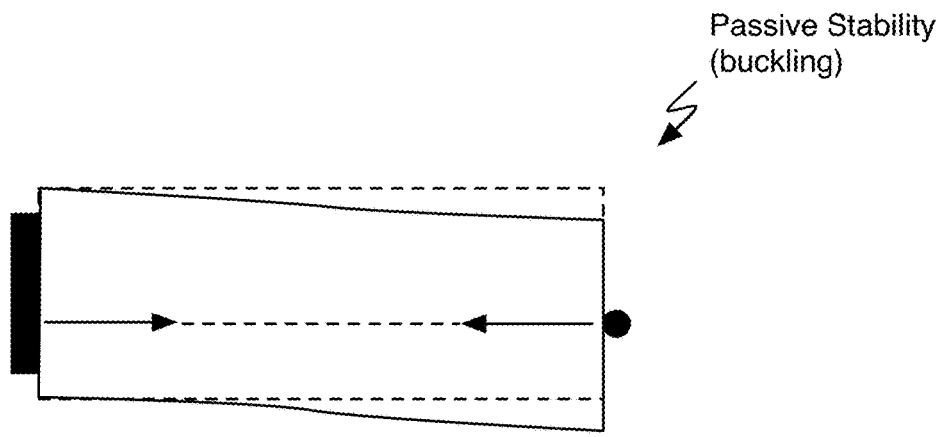
Figure 3C:
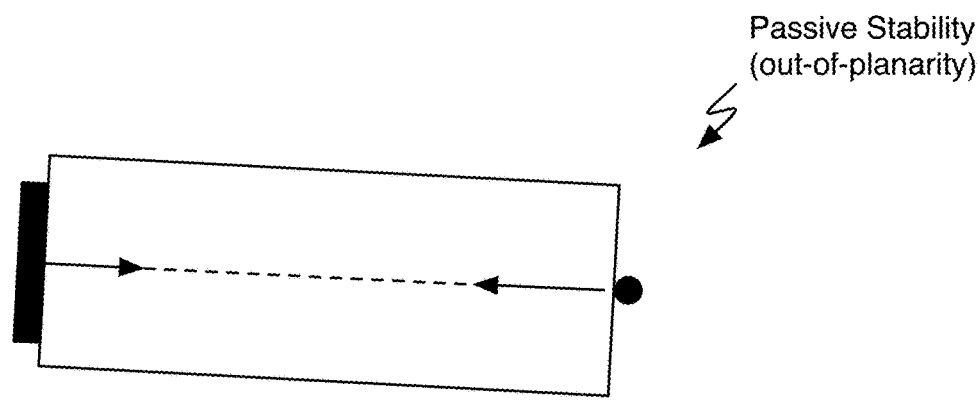
Figure 3D:
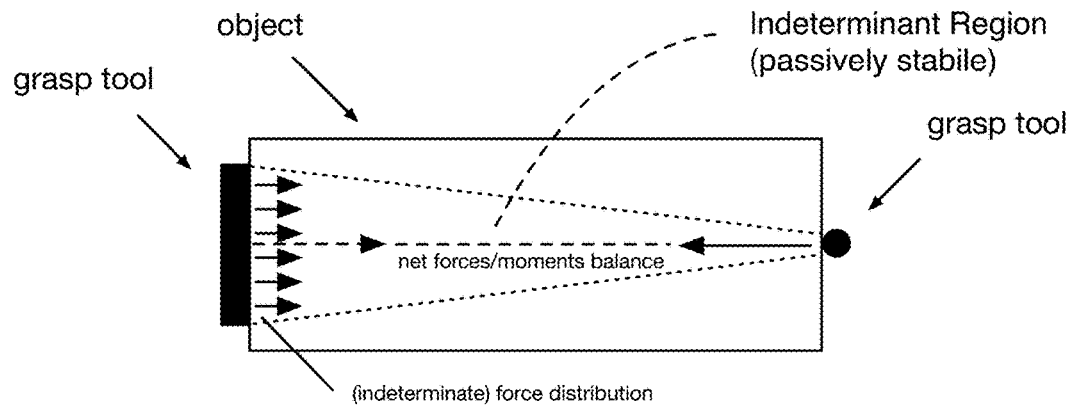
FIGS. 3D-3F are a first, second, and third schematic representation of a variant of the system, respectively.
Figure 3E:
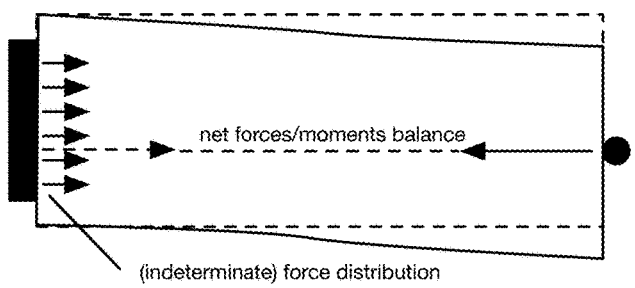
Figure 3F:
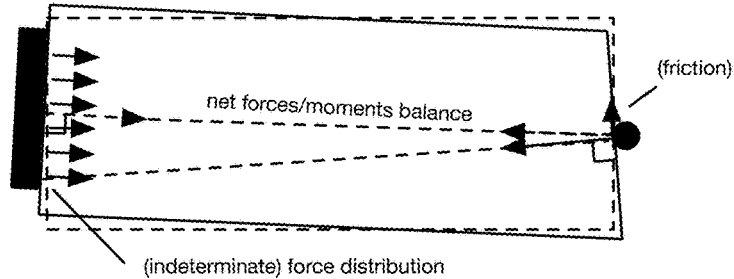

First, variations of this technology can improve the stability of robotic object grasping through the use of geometrically advantageous grasp configurations (e.g., skewed or 'X-shaped' grasp configurations; implemented in robotic planning and/or manipulation control). Such variants may be less sensitive to deviations and/or non-idealities which arise in real-world settings (e.g., especially when robotic control is simplified or streamlined with assumptions of idealized stiffness/rigidity), since they can facilitate passive stabilization and/or self-stabilization under the influence of external perturbations or non-idealities (e.g., out-of-planarity of grasp contacts, object/grasp buckling, object deformation, etc.; examples are shown in FIGS. 2B and 2C). For example, grasp configurations may yield regimes of system indeterminacy (e.g., statically indeterminate grasp configurations; examples are shown in FIGS. 3D-F), where internal forces inherently stabilize the system (e.g., under non-idealized compliance, buckling, object state estimation errors, control errors, etc.; examples are shown in FIGS. 3A-C). Accordingly, this increased stability may improve the generalizability or consistency of grasp execution and object manipulation, particularly when operating at high speed and/or high throughput.

Second, variations of this technology can reduce or eliminate the potential to puncture, pierce, dent, permanently deform, or otherwise damage objects during a grasp, which may otherwise occur as a result of stress concentrations associated with small surface area grasps (e.g., for "point contact" approximations at a target grasp point), particularly when grasping large/heavy objects and/or when utilizing large grasp forces (e.g., where stress concentrations approach or exceed material strength/toughness constraints of target object; a large grasp force can be about 240 lbs, for example). Such variants can facilitate grasping over an extended surface area (e.g., spanning a large fraction of an object width/diagonal; grasp surface along a long axis of a grasp tool) along a contact area which can be approximated as a line or line segment (e.g., under an assumption of rigidity/tangency; which may simplify trajectory planning and/or robotic control).

Third, variations of this technology can facilitate stable grasps of objects for a variety of object dimensions (e.g., within a predetermined range of object sizes), environmental constraints (e.g., within a constrained workspace, etc.), object material properties (e.g., stiffness, compliance, flexural properties, etc.), object mass, object center of mass (CoM), and/or other variances or externalities. In particular, the robot and/or grasp configuration may facilitate grasping with tools and/or end effectors which are independently actuatable and readily capable of traversing dense object scenes. For example, a set of independently actuatable conical frusta grasp tools may traverse dense object environments more readily than end effectors with structurally parallel grasp surfaces (e.g., clamping between two surfaces with a substantially rigid spanning structure providing alignment, single degree of freedom opening/closing an end effector), object-enclosing end effectors (e.g., between 3 or more contact points, crane claw, etc.), or other stable end effectors which are less effective within dense object environments and may otherwise confine or restrict the task space.

However, variations of the technology can additionally or alternately provide any other suitable benefits and/or advantages.

4. Method.

The method S100, an example of which is shown in FIG. 1, can include: optionally providing a set of grasp tools S110; determining an object model for a grasp S120; determining a grasp contact configuration S130; and facilitating grasp execution with the set of grasp tools S140. However, the method S100 can additionally or alternatively include any other suitable elements. The method functions to facilitate non-destructive and/or stable object grasping (and/or object manipulation) using a set of grasp tools.

S100 and/or elements thereof can be performed once (e.g., for a single grasp), iteratively (e.g., for subsequent object grasps and/or iterations), repeatedly, periodically, and/or with any other suitable timing/frequency. As an example, objects can be selectively grasped from a dense object scene (e.g., a plurality of stacked boxes, such as in a cargo container/truck; as part of an unloading sequence).

Optionally providing a set of grasp tools S110 functions to provide a robotic system and/or tools for object grasping/manipulation using a grip surface of the grasp tool (e.g., applying a grasp force of up to about 250 lbs between the grip surfaces of the set of grasp tools).

In a first set of variants, the set of grasp tools can be provided as part of the robotic system (and/or chopstick-style effectors) as described in U.S. application Ser. No. 17/630,795, filed 27 Jan. 2022, which is incorporated herein in its entirety by this reference.

Figure 6:
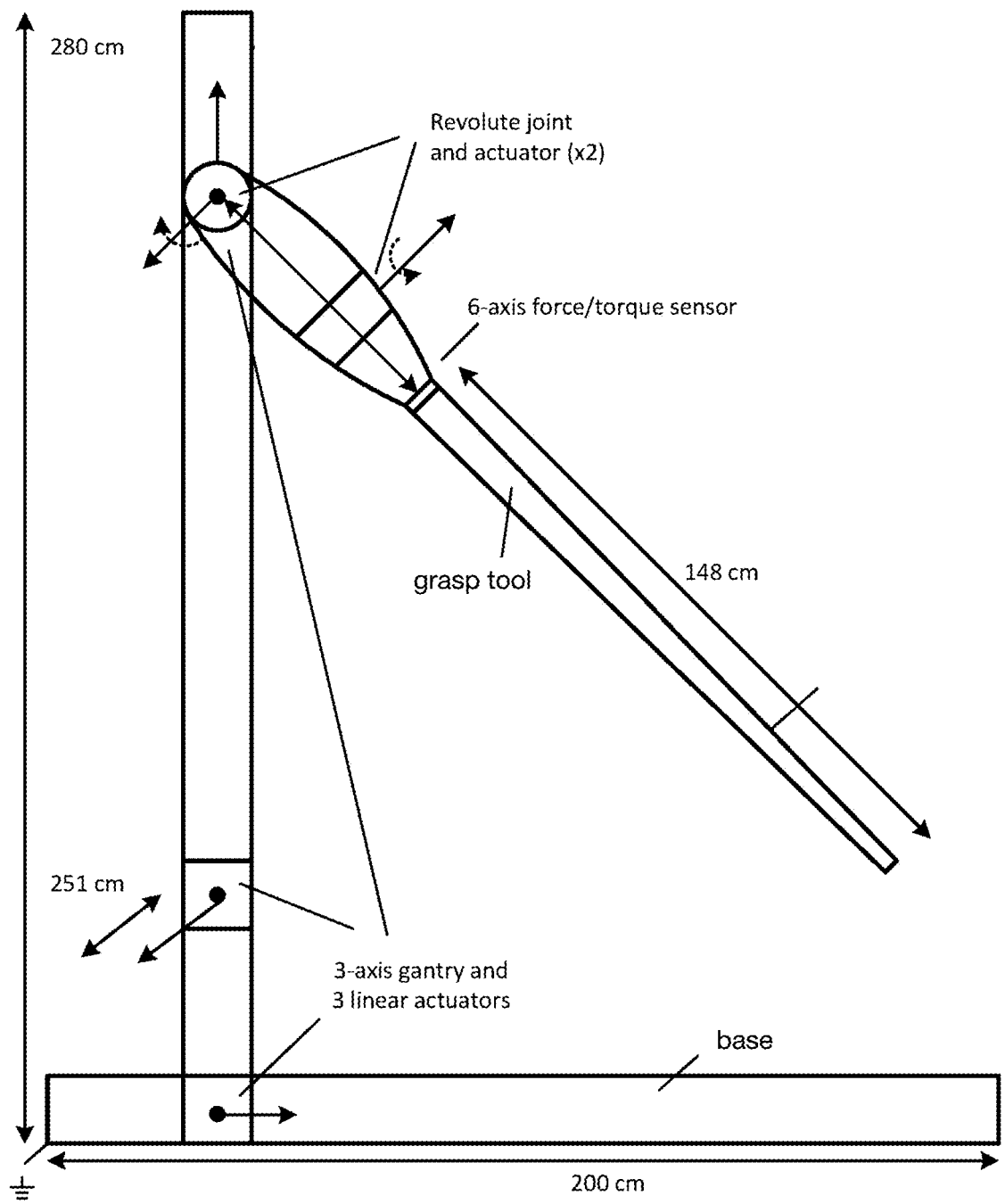
FIG. 6 is a schematic representation of a variant of the system.

In a second set of variants, non-exclusive with the first set, each grasp tool can be independently actuatable by a series of actuation mechanisms (e.g., mechanically connected in series), which can include any suitable combination and/or permutation of rotational and/or linear degrees of freedom. The grasp tools are preferably independently actuatable along at least 2 respective degrees of freedom (e.g., each actuatable along a vertical translation axis and a pitch axis, for example; 2, 3, 4, 5, more than 5 independent degrees of freedom). For example, each grasp tool can be mounted to (and actuatable by) a robotic arm (e.g., 3 DoF, 4 DoF, 5 DoF, 6 DoF, 7 DoF, etc.). In a second example, each grasp tool can be mounted to a linear gantry (e.g., 3-axis gantry system, with one or two rotational actuation mechanisms at an actuated output of the 3-axis gantry system; an example is shown in FIG. 6).

The set of gasp tools and/or robotic system can be provided via a fixed/rigid installation or may be removably provided within a particular operating environment (e.g., movable/rolling frame, automatically inserted into an operating environment) with any suitable timing.

Each grasp tool preferably defines a grip surface extending along a long axis of the tool, which can be used to grasp objects by establishing frictional contact (e.g., maintaining static friction relationship between the tool and the object). Additionally or alternatively, the grasp tool can define a contact patch along all or a portion of the tool length. The grip surface is preferably at least partially rotationally symmetric about a central axis (e.g., the long axis or a reference axis substantially parallel thereto), which may reduce the range of actuation required along one or more axes. In an example, the grip surface can be conical (e.g., conical frustum, cylindrical, semi-cylinder, partial-cylinder, partial conical frustum, etc.), which may fully eliminate the need for roll-rotations about the central axis (by symmetry) during robotic control and/or object manipulation. In such cases, only a portion of the grip surface may come into contact with an object during a grasp (i.e., the 'bearing surface' in contact with the object may be only a fraction of the grip surface), particularly when the object is stiff and/or non-compliant, such as a cardboard box. For example, each cross-section of the frictional grasp surface (e.g., along a length of the tool; orthogonal to the long axis) can be substantially circular. In variants, the grasp surface can extends between a proximal end and a distal end of the grasp tool, wherein the distal end comprises a non-gripping surface (e.g., the grasp tool can grasp the object along a full and/or partial length of the grasp surface, such as based on the length of a contact target line segment and/or environmental constraints).

However, the grasp tool can be otherwise configured.

The length of the grasp tool (e.g., along the long axis) is preferably at least 500% of the width of the grasp tool (e.g., base diameter in the case of a conical tool), but larger than a base width of the grasp tool, and/or the proportion of the length to the width can be: 200%, 500%, 1000%, 1500%, greater than 1500%, any open or closed range bounded by the aforementioned values, and/or any other suitable proportion. For example, the length of the tool can be greater than 500 mm, where the width is less than 50 mm.

Figure 8:
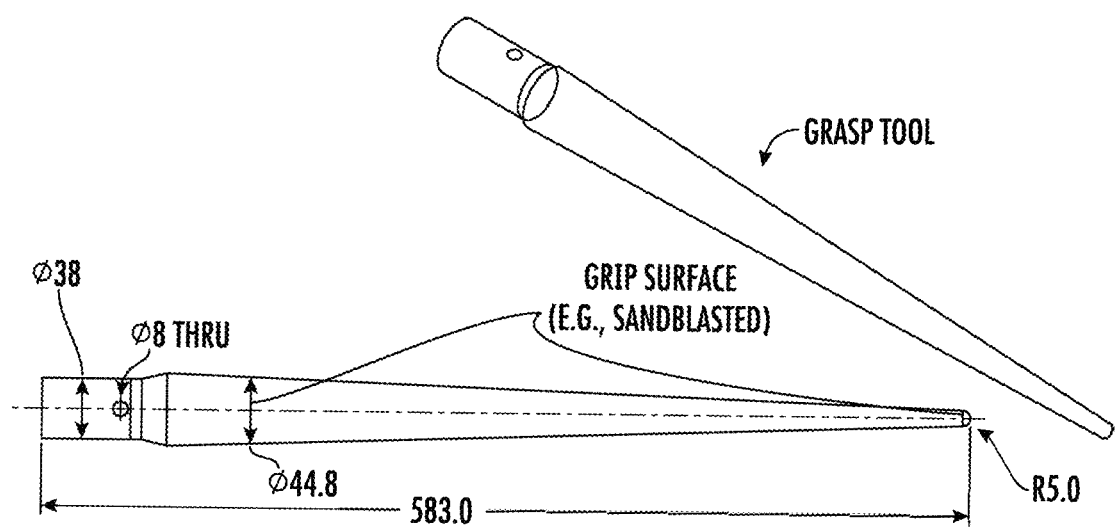
FIG. 8 is a schematic of a variant of a grasp tool with example dimensions in millimeters.

The grasp tool and/or supporting structure (including robotic actuation mechanisms) is preferably stiff, substantially rigid, and/or non-compliant under nominal operating conditions (e.g., global deflection of less than 1 mm under nominal operating load, global deflection of less than 5 mm, etc.). The grasp tool (and/or any supporting structure) material composition is preferably metal (e.g., aluminum alloys, such as 6061-T6, steel alloys, etc.), but can additionally or alternatively include composites (e.g., carbon fiber, fiberglass, overwrapped composite, etc.), polymers (e.g., a plastic end cap, rubber, rubberized coatings, etc.), and/or any other suitable material(s). In a specific example, the grasp tool can be conical-frustum-shaped (e.g., with any suitable base and/or end geometry, such as a dome structure), such as in the example shown in FIG. 8. The grip surface of the grasp tool can be unfinished (e.g., unfinished metal), polished, sandblasted, coated with a secondary material (e.g., with a rubberized coating), powder coated, anodized, and/or otherwise finished.

The set of grasp tools can be mounted to and independently actuatable by a robotic system (e.g., robotic arm, gantry system, and/or any combination thereof), but can alternatively be commonly actuated along one or more control axes or degrees of freedom. For example, grasp tools can be separately/independently actuated by a unitary robotic system, such that the grasp tools share a common base or mounting structure, or can be actuated by fully independent systems. For example, each grasp tool may be actuatable in at least 4 degrees of freedom (e.g., 3 translational axes, one or more rotational axes), where the robotic system can be a 5-axis machine, 6-axis, machine, 7-axis machine, 8-axis machine, 9-axis machine, 10-axis machine, or define any suitable number of actuation axes (or corresponding actuation mechanisms and/or degrees of freedom). As a second example, independently actuatable grasp tools can be independently articulated to grasp an object along a pair of respective contact targets (e.g., skew lines, etc.). For instance, the grasp tools can be separately and/or independently articulated prior to grasping the object (e.g., to avoid environmental collisions) and articulated into the grasp configuration, in which the geometric relationship between the grasp tools can be substantially maintained (e.g., while compressing/squeezing the object).

The set of grasp tools preferably includes a pair of two grasp tools, however any other suitable number of grasp tools can be provided.

However, grasp tools can be otherwise suitably provided and/or the method can be executed using any other suitable robotic system or grasp tools. Alternatively, grasp tools may not be provided in one or more variants of the method (e.g., where grasp tools are a permanent/fixed installation, etc.).

Determining an object model for a grasp S120 functions to determine an object pose to facilitate grasp planning and/or execution. The object model is preferably geometric model, such as a 3D model (e.g., mesh, wireframe, point cloud, parametric geometry, 3D bounding box, etc.), 2.5D model, 2D model (e.g., for a standardized workspace), parametric model (e.g., a sphere defined by a radius; a cylinder defined by a height and a radius; a box defined by a length, width, and height; etc.) and/or any other suitable type of model. Additionally or alternatively, the object model can include kinematic parameters and/or any other suitable object parameters/properties such as object mass, center of mass position, a coefficient of friction (e.g., between grip surface and the object exterior), and/or any other suitable parameters. In a specific example, the object model can include an object pose (e.g., composed of rotational and translational components in 3D: quaternion, SO(3), axis angle, cartesian, etc.; defined in SE(3), etc.) and object dimensions. In a second example, the object model can be an object bounding box (e.g., axis aligned with the robot or in an independent object coordinate frame). In a third example, the object model can be an object model as described in U.S. application Ser. No. 17/630,720, filed 27 Jan. 2022, which is incorporated herein in its entirety by this reference, and/or can be determined by the system and/or method as described therein. In a fourth example, the object model can include a position (e.g., estimated COM, geometric center, corner point, etc.) and a set of orthogonal dimensions. However, any other suitable object model can be used.

In variants, object models can include overhangs (e.g., where a projected area of an upper cross section extends beyond a lower cross section) and/or can exclude overhangs (e.g., at varying levels of granularity, a sphere can be modeled by a cube bounding box, a vertical cylinder bounding box, a semi-sphere merged with a vertical cylinder, etc.; overhangs within an object model may be eliminated directly by manipulation of the model, based on assumptions used estimate the geometry, etc.).

The object model and/or parameters therein can be: predetermined, received from an object pose estimator, automatically determined (e.g., using computer vision, trained object detectors, etc.), received from a perception system, manually determined (e.g., provided by a manual operator as inputs), estimated (e.g., based on a recent grasp history, based on an assumption of a prismatic geometry, based on an assumption of planar and/or orthogonal sides, etc.; in spite of any occlusions), and/or can be otherwise suitably determined. As an example, the object model can be determined by identifying unique objects within a dense image scene (e.g., camera image, lidar image, RGB-d image, etc.) using an object detector and estimating the object dimensions and/or object pose based on detected features (e.g., geometric features, such as the position of detected vertices and/or the pose(s) of detected edges; image features, such as: structural features, edges, corners, blobs, ridges, structured tensors, affine invariant features, descriptive features, SIFT features, SURF features, GLOH features, HOG features, etc.). In a first example, a set of bounding boxes for objects (e.g., cardboard boxes; homogeneous objects; heterogeneous objects; etc.) can be identified with a computer vision (a.k.a., machine vision), such as with a pretrained object detector (e.g., YOLO, RCN, etc.). The object detector can be a generative model, a discriminative model, and/or any other suitable object detector. The object detector can include one or more: neural network (e.g., CNN, R-CNN, FCN, POLO, etc.), graphical model (e.g., Bayesian network), a logistic regression, clustering algorithms, feature detectors (e.g., ORB, SIFT, etc.), histogram of gradients (HOG), single shot detector (SSD), spatial pyramid pooling (SPP-net), and/or any other suitable feature detector(s). In variants, the object detector can include a classifier (e.g., binary classifier, multiclass classifier, etc.) and/or can function classify detected objects. The object detector can include: an integrated object detector/classifier, a binary classifier, a multi-class classifier, a clustering model (e.g., hierarchical clustering model), a regression model, a neural network model (e.g., DNN, CNN, RNN, etc.), a cascade of neural networks, an ensemble of neural networks, compositional networks, Bayesian networks, Markov chains, predetermined rules, probability distributions, heuristics, probabilistic graphical models, and/or other model(s). However, the object detector can include any other suitable model(s).

In a first set of variants, the object model(s) can be received from an object detector (e.g., and/or retrieved from a memory) and/or object tracker, dynamically determined using measurement feedback from a perception suite (e.g., cameras, LIDAR, Radar, RGB camera, depth-imaging data, point cloud data, etc.), predetermined (e.g., based on prior imaging of the environment, such as with a perception suite) and/or otherwise determined.

In a second set of variants, nonexclusive with the first set, the object model can be determined by the method(s) as described in U.S. application Ser. No. 17/630,720, filed 27 Jan. 2022, which is incorporated herein in its entirety by this reference.

In some variants, S120 can include selecting an object (and/or an object model associated therewith) to grasp from a plurality (e.g., as identified/tracked by an object detector). For example, objects can be sequentially selected for grasping and/or manipulation, such as according to a set of predetermined decision trees, heuristics, cost functions, and/or any other suitable selection criteria. Additionally or alternatively, objects can additionally be selected based on an evaluation of the grasp contact configuration (e.g., nonlinear evaluation and/or cost function, etc.).

However, the object model can be otherwise determined.

Determining a grasp contact configuration S130 functions to determine a non-destructive and/or stable object grasping configuration for the set of grasp tools to facilitate grasping and/or manipulation. Additionally or alternatively, the grasp contact configuration can establish a relative geometric relationship of the grasp tools and the object (and/or object model), which can be stably maintained during object manipulation under the influence of non-idealities such as object deformation or control errors.

S130 can include determining contact targets at the periphery of the object model to be engaged by the grip surfaces of a grasp tool(s). The contact target is preferably determined as a line or line segment along a side of the object model (e.g., a modeled surface aligned with a gravity vector, vertical plane, etc.), however the contact targets can alternatively be a surface region and/or define a contact area, a set of points (e.g., for a point contact, sets of points defining a line segment, etc.), extend beyond the face of the object (e.g., where the object dimensions are smaller than the length of the grasp tool, where only a distal portion of the grasp tool may be used to grasp the object, etc.) and/or can be otherwise determined.

In one set of variants, S130 can include determining a first and a second target point on opposite sides of the object model, wherein the ends of the grasp tools are configured to engage at the contact points in the grasp configuration (e.g., point contact). This may be advantageous for grasping some objects (e.g., such as in cases where the grasp tool may operate as an ingressive end effector), but may undesirably damage certain types of objects—particularly large, heavy objects such as cardboard boxes and soft walled vessels (e.g., dumplings, mail bags, etc.)—or yield instability during any subsequent object manipulation.

In a second set of variants, S130 can include determining a first and a second target line (or line segment) contact on opposing surfaces of the object model, wherein the grip surfaces of the grasp tools are configured to engage along the target line contacts. A first variant of such an approach is to select coplanar line contacts (e.g., similar to how humans use chopsticks, for example, with the long axes of the chopsticks arranged in parallel). In the case that the object model is prismatic and/or that the opposing surfaces are substantially parallel planes, these lines can be substantially (or exactly) parallel lines (e.g., an example is shown in FIG. 4D). Such variants may advantageously distribute contact forces (and/or resulting stress concentrations) across a greater surface area of the material and/or grasp tool, which may reduce the likelihood of damaging objects during grasping and/or manipulation. However, coplanar line contacts, an example (2D cross section) is illustrated in the example in FIG. 2A, can additionally result in instability and/or increase the potential for stability errors, such as may result from buckling (e.g., within an object material, etc.; an example is shown in FIG. 2B), planar errors (e.g., 'out-of-planarity' or 'low-planar tolerance' of object surfaces, from control errors, etc.; an example is shown in FIG. 2C; etc.), and/or other sources of error which result in perturbative forces/moments which are not coplanar with the line contacts (and/or which may arise during nondestructive object manipulation). A second example of parallel grasp tools is illustrated in FIG. 4D. Accounting for such errors may necessitate control adjustments to react the resulting moments, which may increase the complexity of the required control and/or may limit the runtime speed of object manipulation based on the resulting dynamics.

Figure 4A:
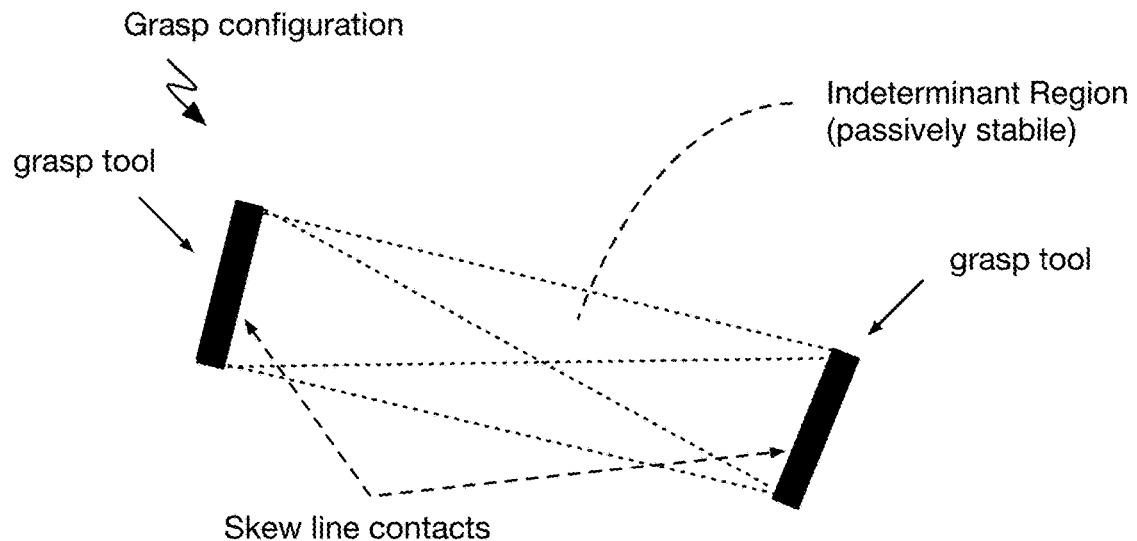
FIGS. 4A-4B are a first and a second 3D representation of a grasp configuration for a set of grasp tools, respectively.
Figure 4B:
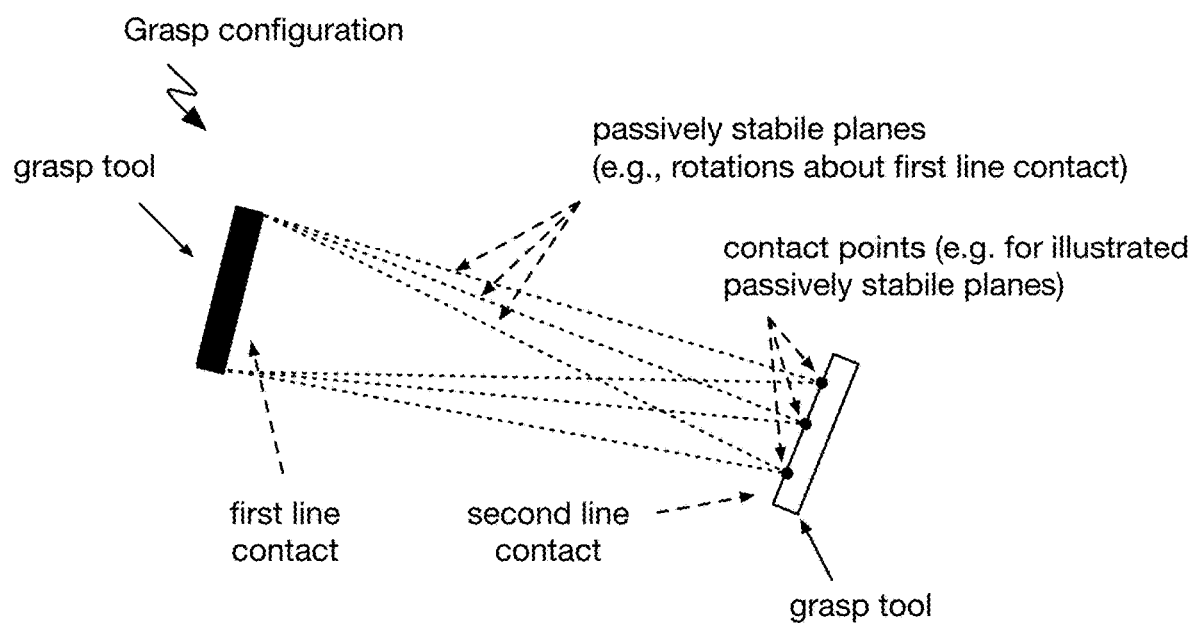
Figure 10:
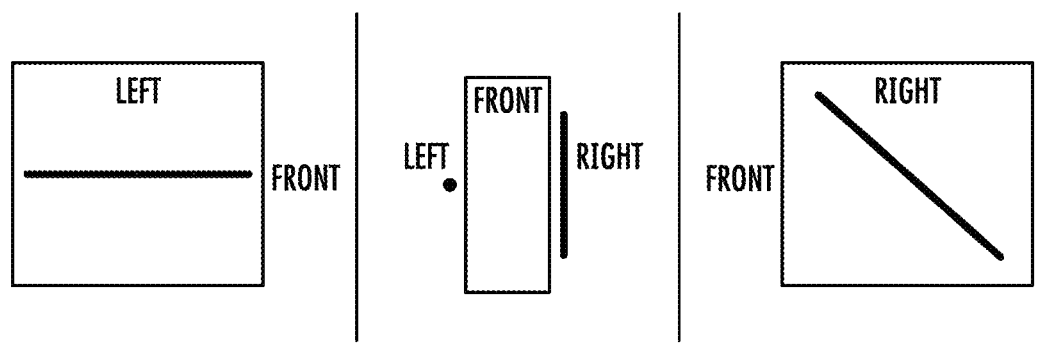
FIG. 10 is an example set of views of a variant of a grasp configuration.

In a second variant of the second set, line contacts can be skew (e.g., not coplanar, non-intersecting; an example is shown in FIG. 10) to increase the stability of the resulting grasp configuration (e.g., examples are shown in FIGS. 3A-3F and FIGS. 4A-4B). For example, (skewed) grasp contact configurations with skew line contacts can be passively stable (e.g., self-stabilizing under unbalanced perturbative forces/moments; where perturbative forces/moments may represent a load fraction of: less than 1%, 1%, 5%, 10%, 20%, 50%, greater than 50%, any open or closed range bounded by the aforementioned values, and/or any other suitable portion of the net load; etc.). Skew line contacts can define a region of indeterminacy, in which perturbative net forces and/or moments may inherently balance/stabilize (e.g., in 2D—examples for a planar representation are shown in FIGS. 3A-3F; in 3D—an example is illustrated in FIGS. 4A-4B; within a predetermined range of forces/moments, such as a load fraction of: less than 1%, 1%, 5%, 10%, 20%, 50%, greater than 50%, any open or closed range bounded by the aforementioned values, and/or any other suitable portion of the net load). Increasing the size (e.g., length in a dimension, area in a plane, volume, etc.) of the region of indeterminacy can increase the inherent stability of the system and/or reduce variance in forces and moments which result from a particular perturbation/error. The skew line contacts can extend over a shared cross-section of the object (e.g., the projection of one line contact overlaps at least a point on the opposing line contact) or can alternatively be fully offset (e.g., the projections in one or more directions do not intersect) and/or can be otherwise vertically or horizontally arranged relative to each other.

In variants, the contact targets can define a region of indeterminacy (a.k.a., indeterminate region; statically and/or dynamically indeterminate internal forces), bounded by the contact targets and/or any reference line extending therebetween (e.g., a 3D volume, a planar region, etc.). As an example, applying opposing grasp forces at the contact targets may over-constrain the system, resulting in static and/or dynamic indeterminacy at the contact targets (e.g., where contact force/pressure distributions may not be deterministic under some sets of rigid body assumptions; where internal forces inherently stabilize the system; examples are shown in FIGS. 3A-3F).

Figure 4C:
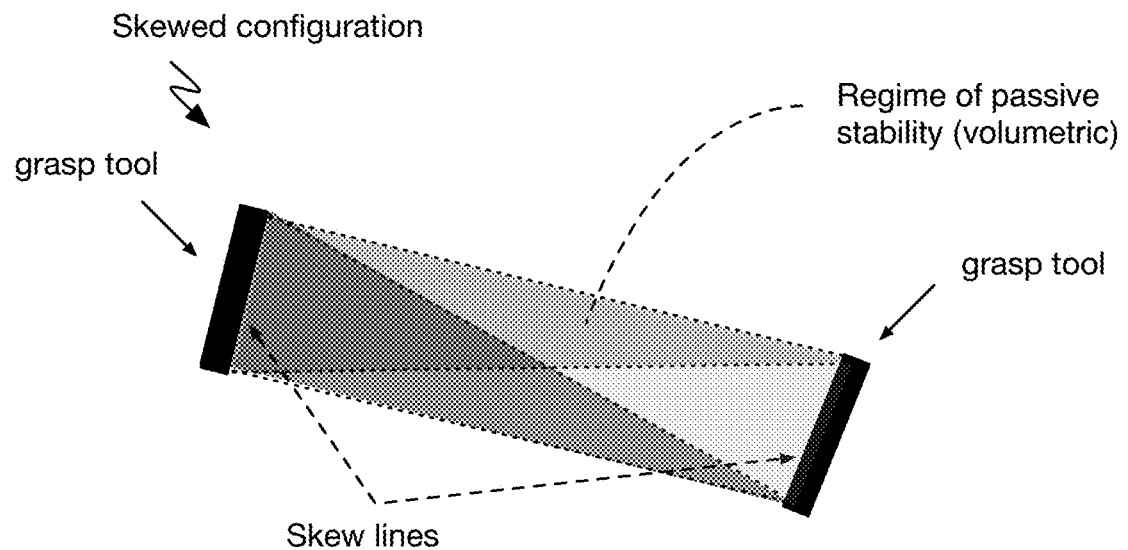
FIG. 4C-4D are a first and second 3D representation of a regime of passive stability for grasp tools in a skewed and parallel configuration, respectively, in a variant of the system.
Figure 4D:
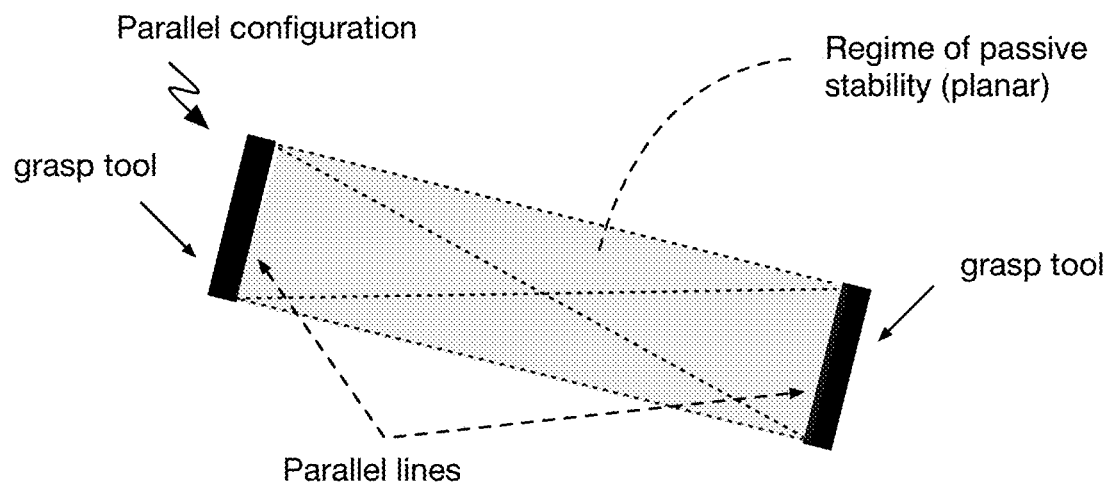

In variants, the region of indeterminacy is tetrahedral or substantially tetrahedral (e.g., where contacts are approximated as line contacts along two edges of a tetrahedron, neglecting deformations of the target object and/or grasp tool; an example is shown in FIG. 4C).

In variants, the region of indeterminacy can span the estimated CoM and/or centroid of the object model (e.g., an example is shown in 11A), which may improve the stability characteristics (e.g., particularly for relatively large net moments). Alternatively, the CoM and/or centroid of the object may not be within the region of indeterminacy (e.g., an example is shown in FIG. 11D), and/or the contact targets can define any other suitable region of indeterminacy. For example, picking object where the region of indeterminacy does not span the CoM may enable objects to be picked even when the object is only partially accessible and/or where the surrounding constraints (e.g., environmental and/or joint constraints) would otherwise restrict the object from being reached (e.g., where the increased stability of the skewed grasps allows these objects to be grasped/picked even in such circumstances).

However, the contact targets can define any other suitable region of indeterminacy.

Contact targets are preferably determined along opposing peripheral surfaces (e.g., left/right sides of a box, relative to gravity) of the modeled object which are substantially aligned with a midsagittal plane of the robotic system (e.g., do not intersect a midsagittal plane of the robotic system, modeled object faces which are parallel to a midsagittal plane of the system, defined between the set of grasp tools, etc.). In one variant, the contact targets can be determined at predetermined peripheral surfaces for a particular object type/model, and/or can be predetermined based on the coordinate system of the robot. For example, contact targets can be determined by default at the same opposing (e.g., left and right) sides of an object model which is an axis aligned bounding box. Alternatively, contact targets can be determined based on any suitable set of opposing object surfaces or opposing sides of an object (e.g., the left and right sides of a spherical object, for example). The contact targets can span a face of the object (e.g., a diagonal), define a dimension based on a length of the grip surface (e.g., same length as grip surface along the tool axis, a partial length; etc.), have an arbitrary length (e.g., where only a target position is defined, such as a point of tangency or a center point, etc.), and/or can be otherwise suitably defined or constrained.

The contact targets can be predetermined (e.g., for a particular object model or class, using a lookup table based on object geometry), dynamically determined (e.g., based on environmental constraints, such as a collision constraint), determined according to a set of predetermined rules/heuristics (e.g., volume maximization of the region of indeterminacy, region of indeterminacy containing the estimated CoM of the object model, collision/environmental offset constraint, etc.), manually determined, automatically determined (e.g., using a trained neural network model), determined at least partially based on a pre-computed optimization, determined based on historical grasp outcomes (e.g., for a similar object geometry, for substantially identical objects, etc.), and/or otherwise determined.

In a first variant, contact targets can be determined by generating a plurality of candidate contact target sets (e.g., using a lookup table, based on object geometric constraints), and selecting a set of contact targets based on a set of heuristics/criteria (e.g., volume maximization for indeterminacy regime; collision constraint; path length minimization; etc.) via a nonlinear optimization, such as a quadratic programming, heuristic searching, Monte Carlo optimization, and/or any other suitable technique(s). As an example, the contact targets can be selected which bound the largest volume tetrahedron (e.g., tetrahedral region of indeterminacy) along the sides of the object and satisfy a predetermined set of constraints (e.g., joint constraints, kinematic constraints, collision constraints, etc.).

Figure 9A:
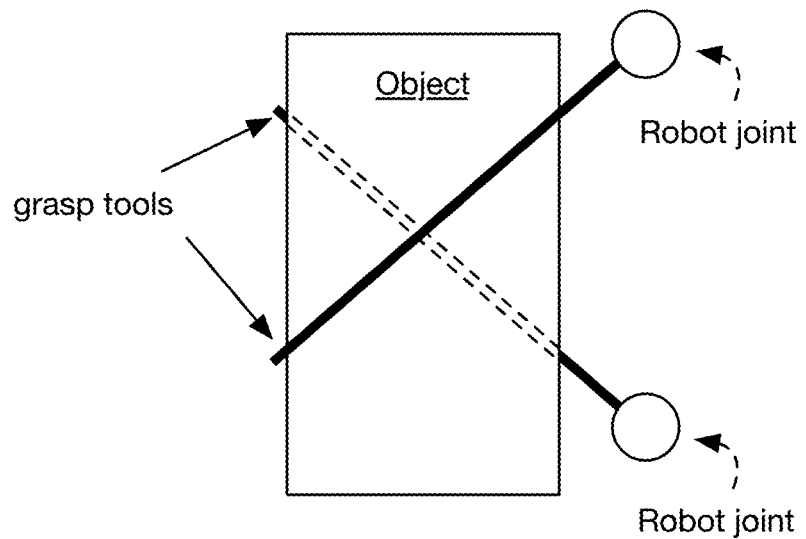
FIGS. 9A-9B are side view representations of a first and a second variant of a grasp configuration, respectively.
Figure 9B:
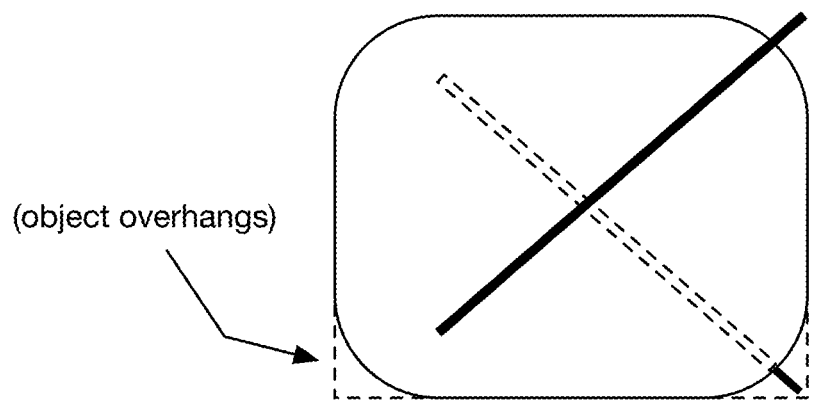

In a second variant, sets of contact targets can be substantially aligned with opposing diagonals of the left/right sides of an object model (e.g., in an 'X' shape, examples of which are shown in FIGS. 9A and 9B).

In a third variant, contact targets can be centered at a predetermined height above a base of an object (e.g., based on a range of motion of the grasp tools and/or robotic system) and in a predetermined relative arrangement (e.g., at least a predetermined skew angle, net skew angle, etc.).

However, the contact targets can be otherwise determined.

Figures 5A, 5B:
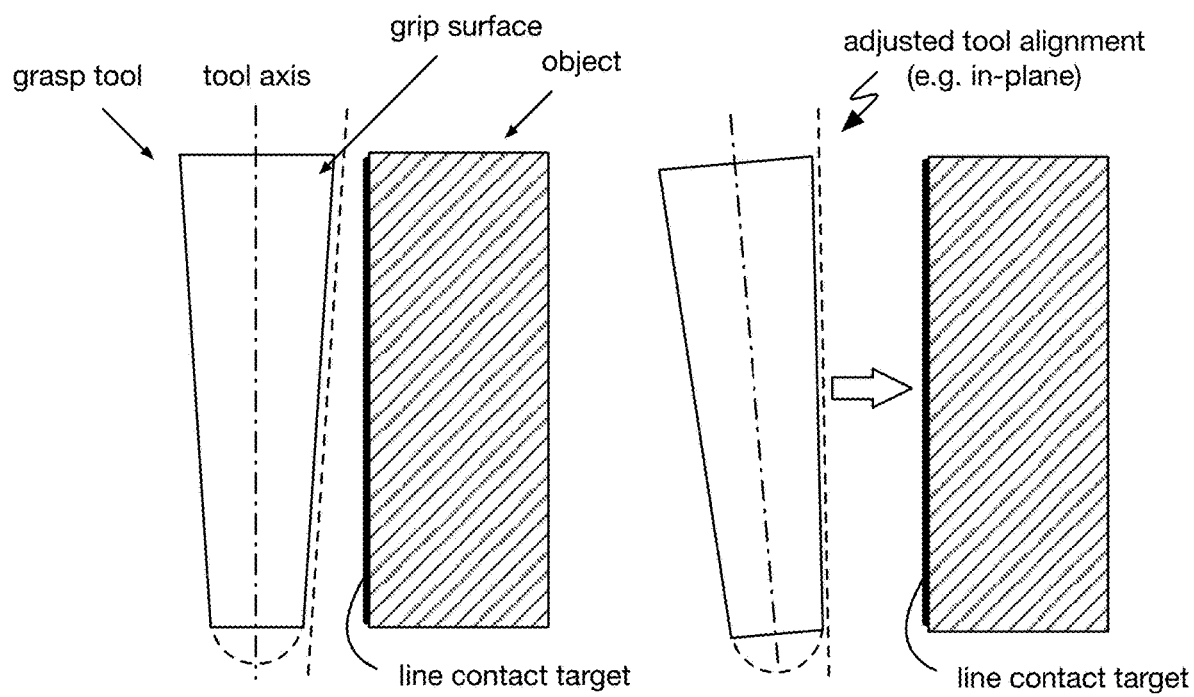
FIGS. 5A-5B are a first and second schematic representation of a first and second configuration of a grasp tool relative to an object, respectively.

S130 can include determining grasp tool poses based on the contact targets, which functions to establish a relative relationship of the object and grasp tools. The grasp tool poses are preferably determined based on the relationship of the grip surface and a tool axis of the grasp tool (e.g., an example is shown in FIGS. 5A and 5B). For example, where the grip surface is cylindrical about the tool axis, the grasp tool pose can be determined by imposing a predetermined offset (e.g., lateral, along a vector defined based on the distance between the contact surfaces, etc.; based on the radius) from the contact target. In a second example, where the grip surface is cylindrical about the tool axis (e.g., a conical frustum), the grasp tool pose can be determined by defining a reference plane (e.g., based on minimum distance vector between contact targets) which contains both the tool axis and the contact target, where the orientation of the tool axis is set with the grip surface coincident with the line contact. In a third example, the pose of the grasp tool is fully constrained by the contact target according to a predetermined geometric relationship (e.g., in cartesian space and/or joint space) between the tool axis (and/or a reference position thereof) and the contact target. However, a grasp tool pose can be otherwise suitably determined relative to the contact target(s).

In some variants, determining the grasp tool pose can optionally include determining a roll orientation of the tool about the tool axis, which functions to align a surface of the tool with the surface of the object. However, variations can alternatively exclude such a determination, by symmetry, where the grip surface is conical (e.g., conical frustum, cylindrical, etc.).

Figure 7A:
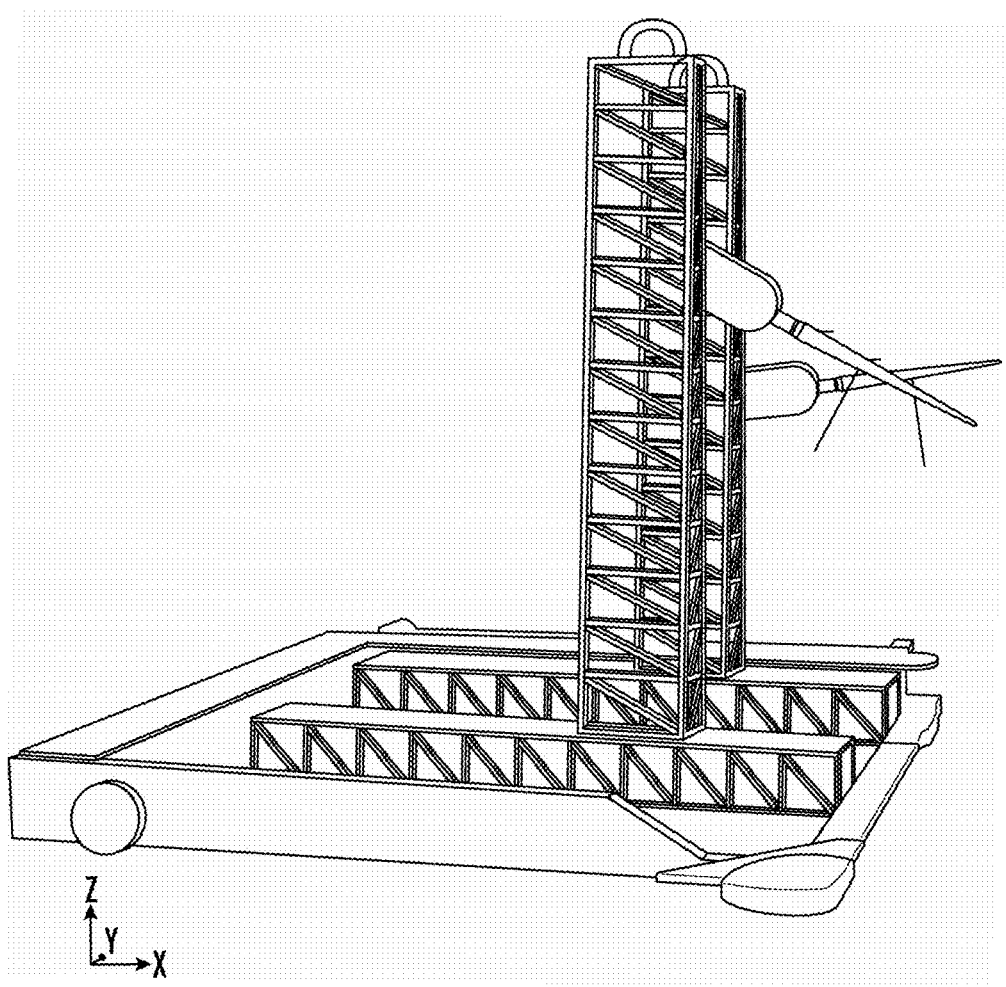
FIGS. 7A-7F are various 3D views of a grasp configuration in a variant of the system and/or method.
Figure 7B:
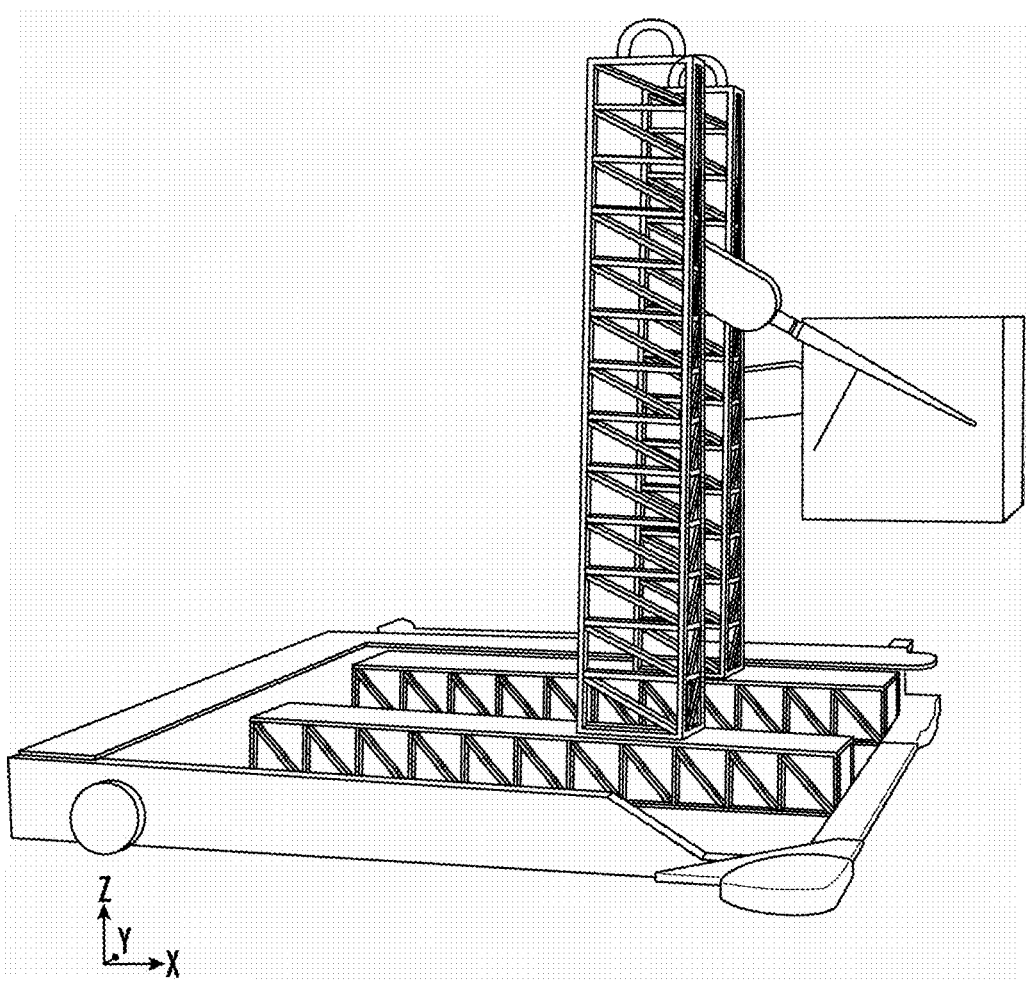
Figure 7C:
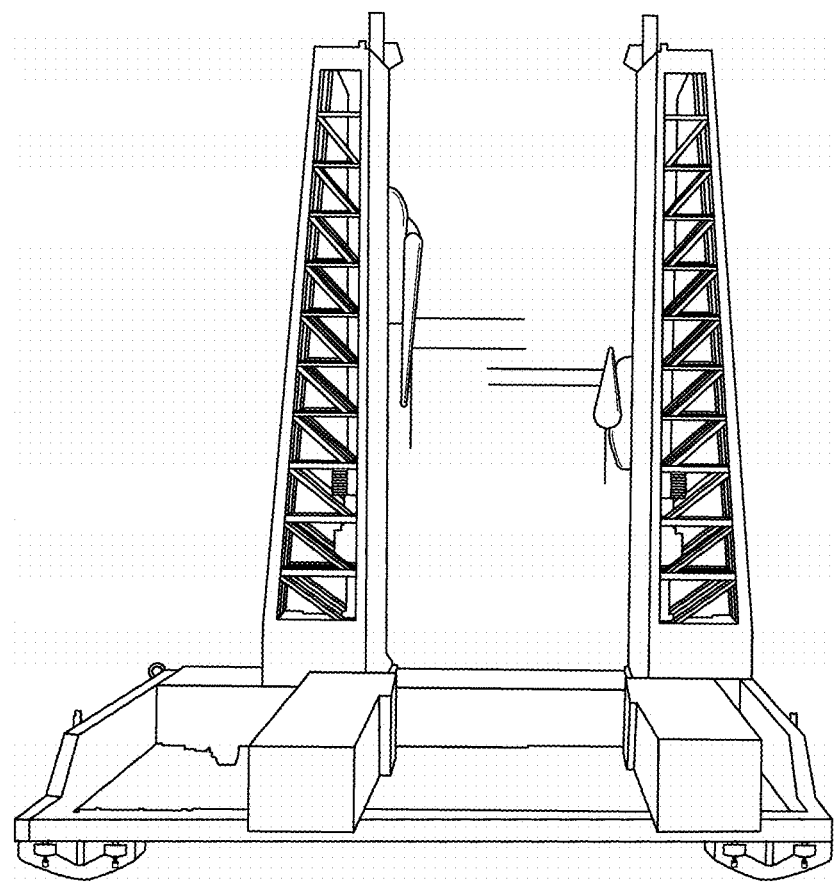
Figure 7D:
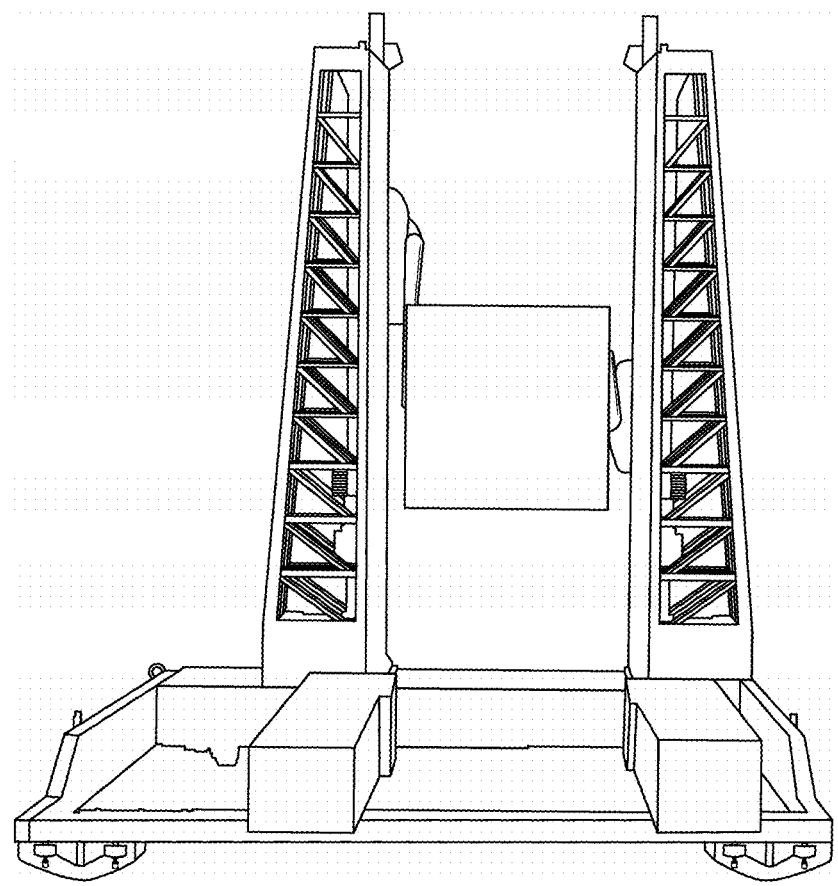
Figure 7E:
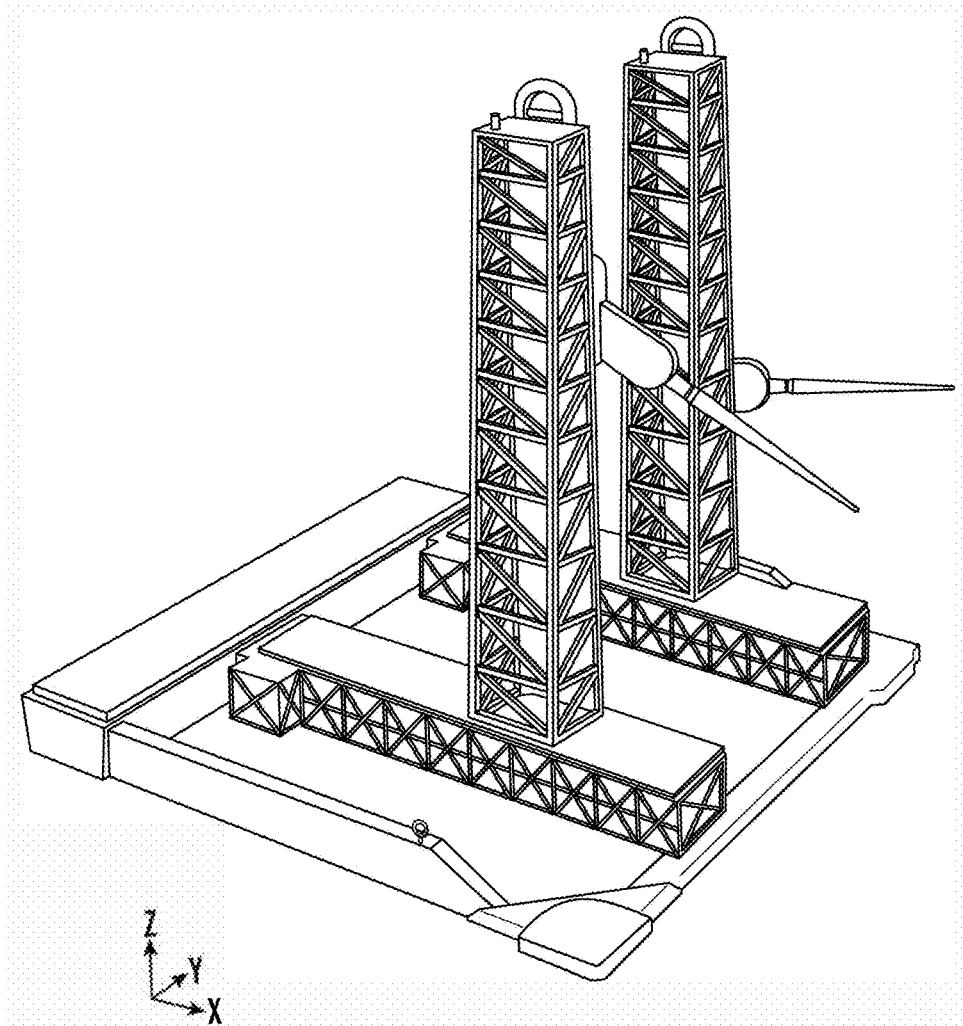
Figure 7F:
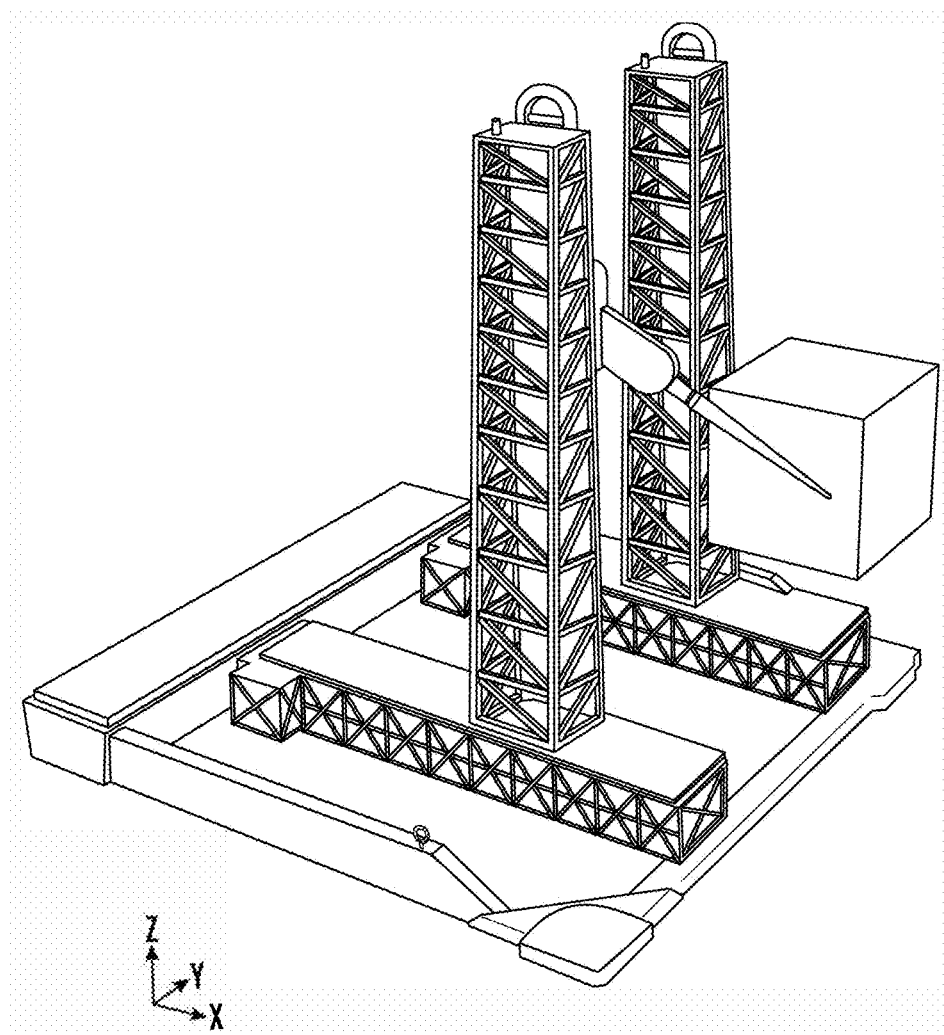

The grasp tool pose can be selected such that a full length of a (frictional) surface of the grasp tool may contact the object (e.g., for large boxes; examples are shown in FIG. 7B) and/or a partial length fraction of the grasp tool may contact the object (e.g., distal end, such as where only a proximal portion of the object is reachable; proximal end such as for large boxes; examples are shown in FIGS. 11A-11D).

In variants, each grasp pose is defined relative to a respective target line segment of contact along a surface of the object model (e.g., wherein the respective target line segments for each grasp pose are each coplanar with a respective face of the surface object model). More specifically, the pair of grasp tools can include a first and second grasp tool corresponding to a first and second grasp pose, respectively, and a first and second target line segment, respectively, wherein the first target line segment defines a first reference plane relative to the surface of the object model, wherein a minimum angle (i.e., the opposite 'acute' skew angles, where the supplementary angles are obtuse) between the first target line segment and a projection of the second target line segment onto the reference plane can be: less than 5 degrees, 5 degrees, 10 degrees, 15 degrees, 20 degrees, 30 degrees, 45 degrees, 60 degrees, 75 degrees, 90 degrees, any range bounded by the aforementioned values, and/or any other suitable angle. More preferably, the minimum angle can be between 15 and 90 degrees (e.g., where the stabilizing effect may be more effective for larger angles, where the resulting volume of the region of indeterminacy may be larger), however the grasp tools can be otherwise configured.

In an example, determining a skewed grasp contact configuration can include determining the grasp poses with a non-linear optimization which maximizes a tetrahedral volume bounded by the respective line segments of contact under a set of constraints (e.g., robot constraints, environmental collision constraints, kinematic constraints, collision constraints, joint constraints, and/or any other suitable constraints; etc.). For example, the non-linear optimization can include: a Monte Carlo optimization, a quadratic program, and/or a heuristic search.

However, the grasp contact configuration can be otherwise determined.

Facilitating grasp execution with the set of grasp tools S140 functions to grasp the object based on the grasp configuration. Additionally or alternatively, S140 can function to facilitate manipulation/transformation of the object in the grasp configuration. In variants, where the grasp configuration of the grasp tools is maintained during manipulation (e.g., without the object slipping), trajectory planning, state estimation, and/or object manipulation within S140 can be primarily based on the (relative) pose geometry of the grasp tools, without requiring significant (or any) perception resources to be dedicated to tracking the object pose. As an example, S140 can facilitate manipulation and/or control entirely based on robotic control feedback (e.g., in absence of perception). However, S140 can additionally or alternatively utilize object tracking and/or perception in some variants, such as to facilitate collision avoidance, failure detection, and/or can be otherwise implemented.

In variants, S140 can facilitate grasp execution based on the grasp contact configuration using the system and/or method as described in U.S. application Ser. No. 17/630,720, filed 27 Jan. 2022, and/or U.S. application Ser. No. 17/630,804, filed Jan. 27, 2022, each of which is incorporated herein in its entirety by this reference.

S140 can include determining control instructions, such as waypoints, trajectories, a sequence of joint states/poses, and/or any other suitable instructions to facilitate traversal of the grasp tools between an initial configuration and the grasp configuration. For example, a trajectory planner can be used to determine a trajectory between an initial configuration and the grasp configuration for each grasp tool of the set, while imposing a set of constraints (e.g., control constraints, collision avoidance constraints, joint constraints, kinematic constraints, dynamic constraints, etc.). However, the set of grasp tools can be otherwise suitably transformed into the grasp contact configuration (e.g., by any suitably trajectory planning and/or robotic control).

S140 can additionally include establishing a static friction relationship between the grip surface and the contact target and/or maintaining the geometric relationship (e.g., relative grasp tool poses) based on the grasp contact configuration, examples of which are shown in FIGS. 7A-F. In such variants, S140 can include compressing the object along a grasp axis (e.g., with a particular 'grip force' or 'grasp force' between the contact targets), while maintaining a relative orientation between the grasp tools (e.g., constraining relative motion to a net translation along the grasp axis). For instance, the object can be frictionally gripped between the grip surfaces of the grasp tool using a grip force (e.g., predetermined for a particular object model, dynamically determined based on the robotic control, etc.). As an example, a robotic system can be controlled to the grasp tools to compress the object (e.g., inwards, orthogonal to the object faces being grasped; in a grasp direction) while manipulating the object though any suitable transformations and/or rotations in SO(3). The grasp force can be substantially constant (e.g., based on the object mass, friction coefficient, and/or edge case dynamic requirements during manipulation), variable, and/or otherwise controlled. For example, the grasp force can be: less than 5 lbs, 5 lbs, 10 lbs, 25 lbs, 50 lbs, 100 lbs, 140 lbs, 200 lbs, 240 lbs, 250 lbs, 300 lbs, 500 lbs, greater than 500 lbs, any open or closed range bounded by the aforementioned values, and/or any other suitable object grasp force.

Figure 12:
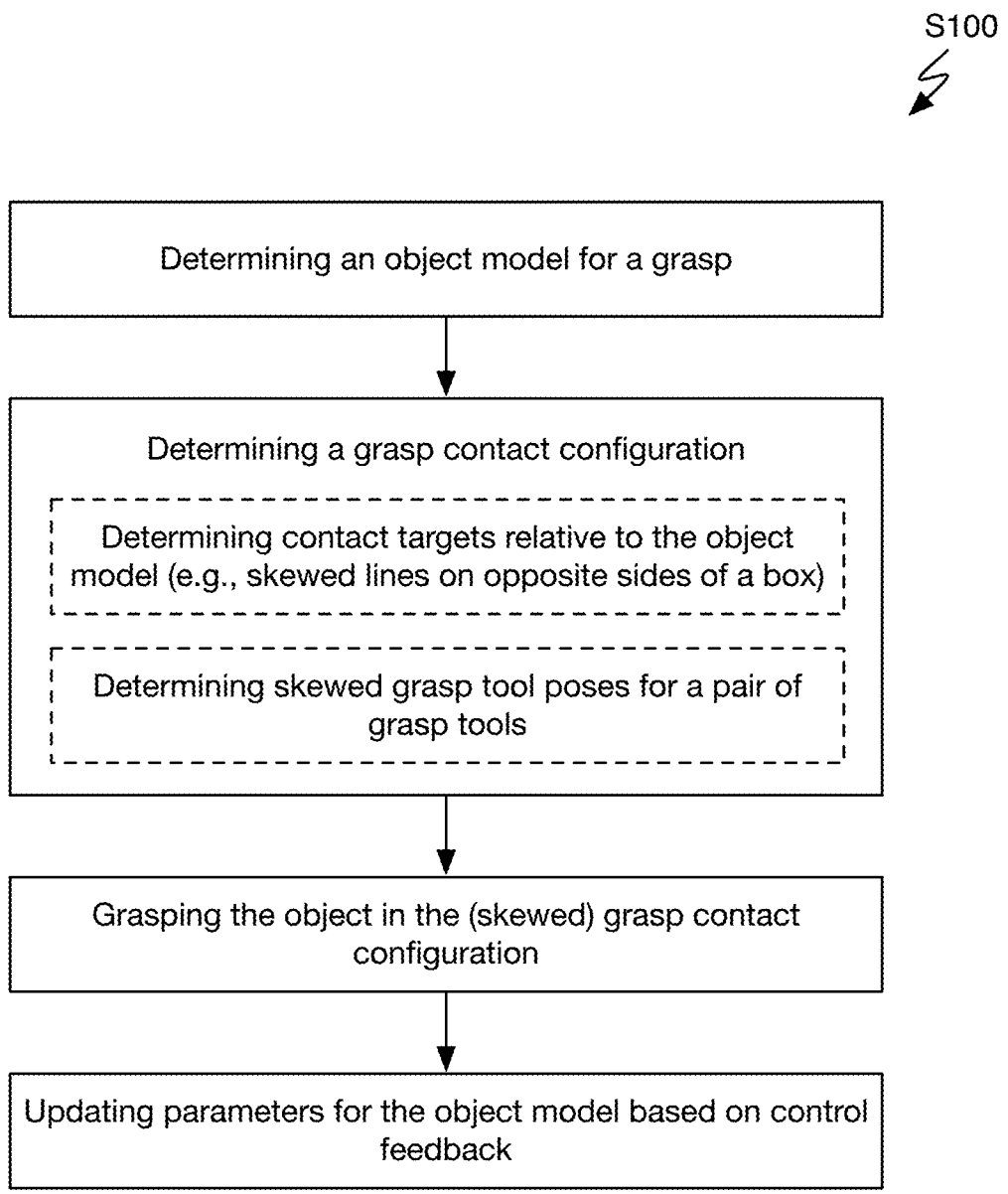
FIG. 12 is a flowchart diagrammatic representation of a variant of the method.
Figure 13:
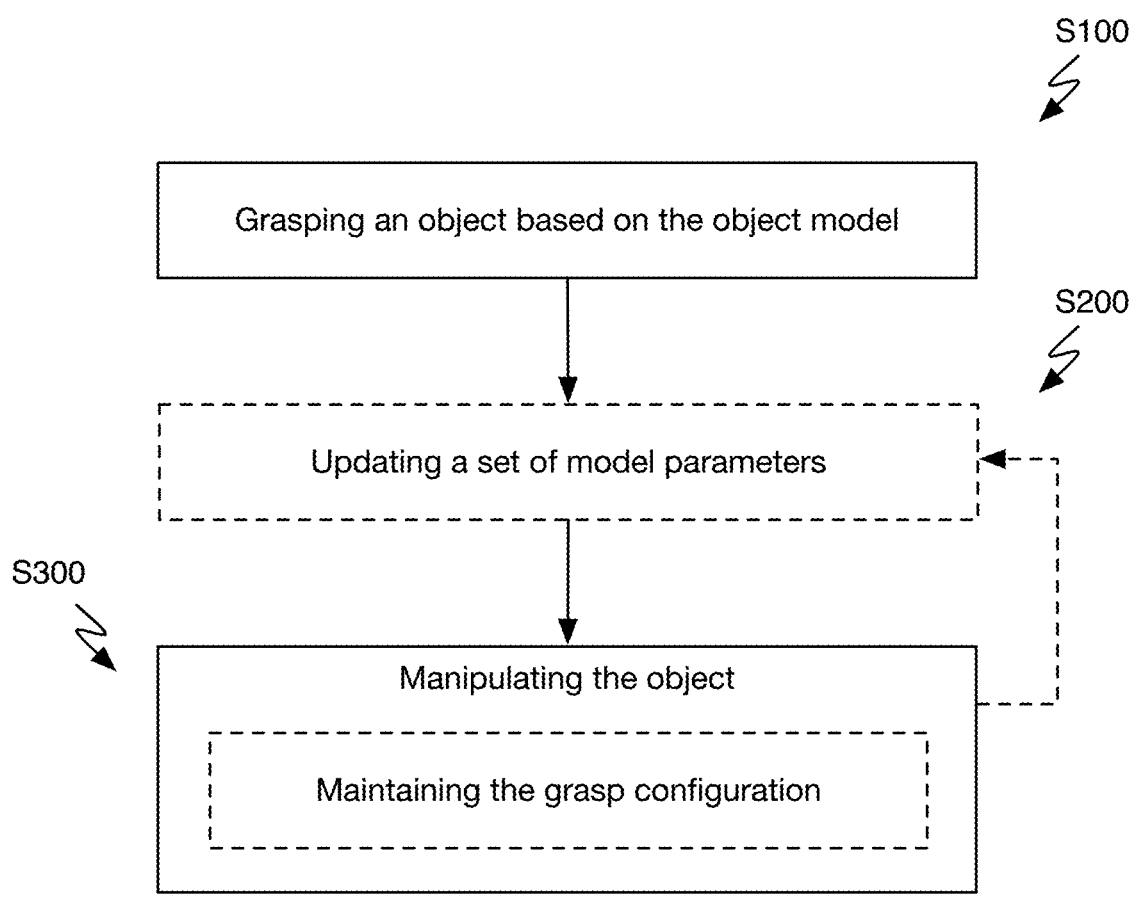
FIG. 13 is a flowchart diagrammatic representation of a variant of the method.

In some variants, S140 can utilize feedback control (e.g., admittance control and/or another feedback controller) to maintain the static frictional relationship between the grip surface and the contact target (e.g., setting an effective spring constant along a particular grasp axis between the contact targets), even under dynamic motions and/or transformations of the grasp tools and/or object (e.g., during various object manipulations). As an example, the grasp contact configuration can allow for grasp stability error adjustments to be accounted for using a linear impedance controller, while any additional manipulation motion planning can be performed using rigid-body kinematic models (e.g., as opposed to dynamically accounting for errors in each control axis) and/or reduced-order computations. This can reduce dynamic stability adjustments from multiple degrees of freedom (e.g., in the case of a 2-point grasp or a parallel line grasp) to a single degree of freedom. However, the grasp relationship can be maintained by any suitable control scheme and/or in conjunction with any suitable motion planning and/or object manipulation approaches. As a second example, S140 can mask positional errors in an 'inward' normal force of the grasp (e.g., orthogonal to a midsagittal plane of the grasp; direction of applied compression force), such as within a predetermined range of compression values (e.g., 10% width compression admitted, etc.). As a third example, S140 can utilize a feedback controller to adjust positional commands based on observed (force) error feedback. Feedback controllers can additionally be implemented with heuristic methods for failure detection, adaptive adjustment of parameters/constraints (e.g., based on initial pose and/or time of initial contact with the object, compression time and/or distance, etc.; an example is shown in FIG. 12; a second example is shown in FIG. 13). In such variants, a substantially stable equilibrium is reached where restitution is countered by force control (e.g., counters error in non-force-controlled direction; admits and stabilizes error in force controlled 'grasp' direction). As a fourth example, S140 can control the grasp tools via forward modeling of estimated object parameters (e.g., modeled object parameters; frictional coefficient, mass, spring constant, etc.; with feedforward control and/or using a feedforward controller). The object parameters object parameters can be dynamically calibrated (e.g., such as with a static friction check to verify the frictional coefficient; the width of the object in the grasp direction can be calibrated based on the grasp tool poses at initial contact; etc.), adaptively updated (e.g., where the object mass can estimated based force feedback and/or resulting system dynamics), and/or otherwise estimated/refined (e.g., based on a prior, based on historical grasps, etc.).

In some variants, the resulting deformation on an object during grasp execution and/or object manipulation can be: less than 0.1 mm, 0.5 mm, 1 mm, 2 mm, 4 mm, 6 mm, 10 mm, greater than 10 mm, any open or closed range bounded by the aforementioned values, and/or any other suitable object deformation. In contrast, the resulting deformation/deflection of the end effector is preferably less than 0.1 mm and/or has comparatively greater stiffness than the object (e.g., resulting deformation of object can be one or more orders of magnitude greater than the deflection of the end effector in some cases), but can alternatively be greater than 0.1 mm, and/or can have any other suitable absolute or relative stiffness.

However, grasps can be otherwise suitably executed and/or an object can be otherwise suitably manipulated using the grasp tools and/or based on the grasp configuration.

In variants, the method can optionally include updating parameters for the object model based on control feedback S200. In a first example, the object mass can be initially estimated (e.g., initial mass estimate can be predetermined; estimated based on perception and/or bounding box volume; estimated based on an existing label, predetermined prior to grasping the object; etc.) and can be dynamically/adaptively updated based on control feedback (e.g., where the mass can be inferred from control dynamics, based on the weight; using force-torque sensing; etc.). In a second example, the static friction coefficient (and/or a lower bound of an estimate thereof) can be determined based on a static friction check with the object supported on a substantially rigid supporting body (e.g., the ground, a substantially rigid platform/table, etc.), wherein object can be grasped with the grip surface (e.g., with a known compression force) while the grasp tools are controlled to apply force vertically downward (e.g., pressing the object against a supporting body, such as the ground, while compressing the object along a grasp direction) until the grasp tools slip (e.g., where the normal force and vertically downward force at the onset of downward motion/slippage can be used to estimate the coefficient of friction) and/or until a threshold condition is satisfied (e.g., threshold downward force achieved, which can be used to setting a lower bound on the static frictional coefficient, etc.). In a third example, the object dimensions can be updated based on the grasp tool pose upon initial contact (e.g., position feedback used to set uncompressed object width). In a fourth example, the object compliance (and/or the inverse: object stiffness) can be estimated and/or updated based on the area of contact between the object and the grasp tool, the interaction force between the two bodies (e.g., applied grasp force, as estimated from control effort and/or measured force feedback at the grasp tool), and the deformation of the body relative to the dimension(s) upon initial contact (i.e. the surface is pushed inwards by the applied grasp force between finger and body). For example, the Young's modulus (a.k.a., modulus of elasticity) can be estimated based on the measured deformation (i.e., measured strain; based on the relative pose of the grasp tools) relative to the (undeformed) object dimensions upon initial contact, as a function of the applied force and estimated contact surface area (i.e., estimation of applied stress). However, any other suitable parameters of the object model can be estimated and/or updated based on the object grasp, object manipulation, and/or control feedback (e.g., while maintaining the grasp); and/or object parameters can be estimated/updated with any other suitable timing.

In variants (e.g., an example is shown in FIG. 13), the method can include or be used in conjunction with manipulating the object S300. For example, S300 can include kinematically controlling the robotic system based on the object model and a kinematic model of the robot system, wherein the geometric relationship defines a region of force indeterminacy which passively stabilizes the object. In a second example, the robotic system can be controlled to maintain the grasp configuration in conjunction with the system(s) and/or control method(s) as described in U.S. application Ser. No. 17/630,720, filed 27 Jan. 2022, U.S. application Ser. No. 17/630,795, filed 27 Jan. 2022, and U.S. application Ser. No. 17/630,804, filed 27 Jan. 2022, each of which is incorporated herein in its entirety by this reference.

Alternative embodiments implement the above methods and/or processing modules in non-transitory computer-readable media, storing computer-readable instructions. The instructions can be executed by computer-executable components integrated with the computer-readable medium and/or processing system. The computer-readable medium may include any suitable computer readable media such as RAMs, ROMs, flash memory, EEPROMs, optical devices (CD or DVD), hard drives, floppy drives, non-transitory computer readable media, or any suitable device. The computer-executable component can include a computing system and/or processing system (e.g., including one or more collocated or distributed, remote or local processors) connected to the non-transitory computer-readable medium, such as CPUs, GPUs, TPUS, microprocessors, or ASICs, but the instructions can alternatively or additionally be executed by any suitable dedicated hardware device.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

We claim:

1. A grasp method comprising:
providing a pair of grasp tools, each comprising a grasp surface which defines a right conical frustum about a central axis of the grasp tool;
determining an object model for an object;
based on the object model, determining a skewed grasp contact configuration, comprising a grasp pose for each grasp tool of the pair; and
grasping the object with the pair of grasp tools in the skewed grasp contact configuration.

2. The method of claim 1, wherein the skewed grasp contact configuration is passively stable.

3. The method of claim 2, wherein the skewed grasp contact is configured to passively stabilize buckling errors and planar errors.

4. The method of claim 1, wherein the skewed grasp contact configuration defines a region of force indeterminacy.

5. The method of claim 4, wherein the region of force indeterminacy is tetrahedral.

6. The method of claim 4, wherein the region of indeterminacy does not span a center of mass of an object associated with the object model.

7. The method of claim 1, wherein each grasp pose is defined relative to a respective target line segment of contact along a surface of the object model.

8. The method of claim 7, wherein the pair of grasp tools comprises a first and second grasp tool corresponding to a first and second grasp pose, respectively, and a first and second target line segment, respectively, wherein the first target line segment defines a first reference plane relative to the surface of the object model, wherein a minimum angle between the first target line segment and a projection of the second target line segment onto the reference plane is between 15 and 90 degrees.

9. The method of claim 7, wherein the respective target line segments for each grasp pose are each coplanar with a respective face of the surface object model.

10. The method of claim 7, wherein determining the skewed grasp contact configuration comprises determining the grasp poses with a non-linear optimization which maximizes a tetrahedral volume bounded by the respective line segments of contact under:
a set of kinematic constraints, and
a set of collision constraints.

11. The method of claim 7, wherein the set of collision constraints comprise environmental collision constraints.

12. The method of claim 10, wherein the non-linear optimization comprises at least one of: a Monte Carlo optimization, a quadratic program, or a heuristic search.

13. The method of claim 1, further comprising: manipulating the object with the pair of grasp tools while controlling the pair of grasp tools to maintain the skewed grasp contact configuration using an admittance controller.

14. The method of claim 1, wherein the grasp surface extends between a proximal end and a distal end of the grasp tool, wherein the distal end comprises a non-gripping surface.

15. A grasp method for an object, comprising:
determining an object model for the object;
determining a pair of contact targets along opposite sides of the object model, wherein the pair of contact targets define a pair of skew lines; and
with a robotic system comprising a pair of grasp tools each having a frictional grasp surface along a long axis of the grasp tool, grasping the object with the pair of grasp tools, comprising:
independently articulating each grasp tool of the pair of grasp tools to grasp the object based on a respective contact target of the pair of contact targets.

16. The method of claim 15, wherein each cross-section of the frictional grasp surface, orthogonal to the long axis, is substantially circular.

17. The method of claim 15, further comprising: manipulating the object with the robotic system; and, in a grasp configuration, substantially maintaining a geometric relationship between the pair of grasp tools, wherein the geometric relationship is passively stable.

18. The method of claim 17, wherein manipulating the object with the robotic system comprises kinematically controlling the robotic system based on the object model and a kinematic model of the robot system, wherein the geometric relationship defines a region of force indeterminacy which passively stabilizes the object.

19. The method of claim 15, wherein the pair of contact targets comprise a pair of line segments on opposite sides of the object model and are determined with a non-linear optimization to maximize a tetrahedral volume bounded by the line segments under a set of robot constraints.

20. The method of claim 15, wherein, for each grasp tool, the frictional grasp surface extends between a proximal end and a distal end of the grasp tool, wherein the distal end comprises a non-gripping surface.

* * * * *

UNITED STATES PATENT AND TRADEMARK OFFICE
CERTIFICATE OF CORRECTION

| | |
|---|---|
| PATENT NO. | : 11,845,184 B2 |
| APPLICATION NO. | : 18/136215 |
| DATED | : December 19, 2023 |
| INVENTOR(S) | : Samuel Zapolsky and Evan Drumwright |

It is certified that error appears in the above-identified patent and that said Letters Patent is hereby corrected as shown below:

In the Claims

Column 14, Line 59, In Claim 11, delete "claim 7," and insert --claim 10,-- therefor Column 14, Line 64, In Claim 13, after "comprising:", insert --¶--

Column 15, Line 20, In Claim 17, after "comprising:", insert --¶--

Column 15, Line 21, In Claim 17, after "and,", insert --¶--

Signed and Sealed this
Thirteenth Day of February, 2024

Katherine Kelly Vidal
*Director of the United States Patent and Trademark Office*